US00RE50792E

(19) United States
(12) Reissued Patent
Chen et al.

(10) Patent Number: US RE50,792 E
(45) Date of Reissued Patent: Feb. 10, 2026

(54) FILTER PROCESSING APPARATUS AND CONTROL METHOD THEREOF

(71) Applicant: CANON KABUSHIKI KAISHA, Tokyo (JP)

(72) Inventors: Tsewei Chen, Tokyo (JP); Masami Kato, Sagamihara (JP)

(73) Assignee: Canon Kabushiki Kaisha, Tokyo (JP)

(21) Appl. No.: 18/062,784

(22) Filed: Dec. 7, 2022

Related U.S. Patent Documents

Reissue of:
(64) Patent No.: 10,861,123
Issued: Dec. 8, 2020
Appl. No.: 16/157,281
Filed: Oct. 11, 2018

(30) Foreign Application Priority Data

Oct. 17, 2017 (JP) ..... 2017-201247

(51) Int. Cl.
*G06T 1/20* (2006.01)
*G06F 7/544* (2006.01)
*G06F 9/54* (2006.01)
*G06T 1/60* (2006.01)

(52) U.S. Cl.
CPC ..... *G06T 1/20* (2013.01); *G06F 7/5443* (2013.01); *G06F 9/545* (2013.01); *G06T 1/60* (2013.01); *G06T 2200/04* (2013.01)

(58) Field of Classification Search
None
See application file for complete search history.

(56) References Cited

U.S. PATENT DOCUMENTS 6,292,621 B1 9/2001 Tanaka et al.
7,432,985 B2 10/2008 Ishikawa et al.
8,320,696 B2 11/2012 Yamamoto et al.
(Continued)

FOREIGN PATENT DOCUMENTS

JP 2010-015257 A 1/2010
JP 2010-134697 A 6/2010
(Continued)

OTHER PUBLICATIONS

Majida Kazmi, et al., "A Low Cost Structurally Optimized Design for Divers Filter Types", PLoS One 11(11) e0166056, doi:10.1371/journal.pone.0166056 (Nov. 10, 2016), pp. 1-25.
(Continued)

*Primary Examiner* — Yuzhen Ge
(74) *Attorney, Agent, or Firm* — Venable LLP

(57) ABSTRACT

A filter processing apparatus comprises: K arithmetic operation units configured to perform predetermined arithmetic operation processing parallelly; a data holding unit configured to hold a plurality of data values; a coefficient holding unit configured to hold a plurality of filter coefficients; a first pattern holding unit configured to hold a first pattern that selects K data values from the plurality of data values; a second pattern holding unit configured to hold a second pattern that selects one filter coefficient from the plurality of filter coefficients; and a control unit configured to sequentially input the K data values to the K arithmetic operation units with reference to the first pattern and sequentially input the one common filter coefficient to the K arithmetic operation units with reference to the second pattern.

22 Claims, 16 Drawing Sheets

(56) References Cited

U.S. PATENT DOCUMENTS

| | | | | |
|---|---|---|---|---|
| 8,832,004 | B2 | 9/2014 | Kato et al. | |
| 9,135,553 | B2 | 9/2015 | Kato et al. | |
| 10,387,988 | B2 | 8/2019 | Meixner et al. | |
| 10,387,989 | B2 | 8/2019 | Meixner et al. | |
| 11,450,086 | B2 * | 9/2022 | Cho | G06N 3/045 |
| 2006/0228027 | A1 * | 10/2006 | Matsugu | G06K 9/00973 382/181 |
| 2010/0046851 | A1 * | 2/2010 | Inoue | H04N 19/82 386/314 |
| 2011/0239032 | A1 * | 9/2011 | Kato | G06N 3/063 713/500 |
| 2013/0259142 | A1 * | 10/2013 | Ikeda | H04N 19/176 375/240.29 |
| 2014/0337262 | A1 | 11/2014 | Kato et al. | |
| 2016/0297191 | A1 * | 10/2016 | Murasawa | B41J 2/04536 |
| 2016/0335082 | A1 * | 11/2016 | Sadeh | G06F 9/30036 |
| 2017/0011006 | A1 | 1/2017 | Saber et al. | |
| 2017/0116495 | A1 * | 4/2017 | Nomura | G06F 17/153 |
| 2017/0249716 | A1 | 8/2017 | Meixner et al. | |
| 2017/0287103 | A1 | 10/2017 | Meixner et al. | |
| 2017/0300776 | A1 * | 10/2017 | Yamamoto | G06K 9/4628 |
| 2019/0212982 | A1 * | 7/2019 | Yoda | G06T 1/20 |
| 2020/0020069 | A1 | 1/2020 | Meixner et al. | |

FOREIGN PATENT DOCUMENTS

| | | | |
|---|---|---|---|
| JP | 5376920 | B2 | 12/2013 |
| WO | 2017/146816 | A1 | 8/2017 |

OTHER PUBLICATIONS

Christian Tenllado, et al., "Parallel Implementation of the 2D Discrete Wavelet Transform on Graphics Processing Units: Filter Bank versus Lifting," IIEEE Transactions on Parallel and Distributed Systems, vol. 19, No. 3, Mar. 2008, pp. 299-310.

Norihiro Takahashi, "A Pixel-Parallel Self-Similitude Processing for Multiple-Resolution Edge-Filtering Analog Image Sensors," IEEE Transactions on Circuits and Systems-I: Regular Papers, vol. 56, No. 11, Nov. 2009, pp. 2384-2392.

Anil K. Jain, "Advances in Mathematical Models for Image Processing," Proceedings of the IEEE, vol. 69, No. 5, May 1981, pp. 502-528.

Viktor Gruev, et al., "Implementation of Steerable Spatiotemporal Image Filters on the Focal Plane," IEEE Transactions on Circuits and Systems-II: Analog and Digital Signal Processing, vol. 49, No. 4, Apr. 2002, pp. 233-244.

Hiroyuki Takeda, et al., "Kernel Regression for Image Processing and Reconstruction," IEEE Transactions on Image Processing, vol. 16, No. 2, Feb. 2007, pp. 349-366.

Hiroyuki Yamasaki, et al., "Application of the massively parallel embedded processor (MX) to real-time image processing," IEICE Technical Report, Japan, The Institute of Electronics, Information and Communication Engineers, vol. 108, No. 86, Jun. 6, 2008, pp. 33-38.

Kota Ando, "Data-flow reconfigurable processor array architecture for deep convolutional neural networks," IEICE Technical Report, Japan, The Institute of Electronics, Information and Communication Engineers, vol. 116, No. 53, May 12, 2016, pp. 29-34.

Oct. 25, 2021 Japanese Official Action in Japanese Patent Appln. No. 2017-201247.

Christian Tenllado,Parallel Implementation of the 2D Discrete Wavelet Transform on Graphics Processing Units: Filter Bank versus Lifting,IEEE Transactions on Parallel and Distributed Systems, vol. 19, No. 3, Mar. 2008,pp. 299-306.*

Norihiro Takahashi,A Pixel-Parallel Self-Similitude Processing for Multiple-Resolution Edge-Filtering Analog Image Sensors, IEEE Transactions on Circuits and Systems—I: Regular Papers, vol. 56, No. 11, Nov. 2009,pp. 2385-2391.*

Nil K. Jain,Advances in Mathematical Models for Image Processing, Proceedings of the IEEE, vol. 69, No. 5, May 1981, pp. 510-519.*

Viktor Gruev,Implementation of Steerable Spatiotemporal Image Filters on the Focal Plane,IEEE Transactions on Circuits and Systems—II: Analog and Digital Signal Processing, vol. 49, No. 4, Apr. 2002,pp. 233-239.*

Hiroyuki Takeda,Kernel Regression for Image Processing and Reconstruction,IEEE Transactions on Image Processing, vol. 16, No. 2, Feb. 2007,pp. 349-357 .*

Mar. 19, 2019 European Search Report in European Patent Appln. No. 18198792.6.

* cited by examiner

FIG. 10

1001

| m | 1 | 2 | 3 | 4 | 5 | 6 | 7 | 8 | 9 |
|---|---|---|---|---|---|---|---|---|---|
| $P_D(m)$ | | 0 | 0 | 1 | 2 | 2 | 1 | 0 | 0 |
| $Ix(P_D(m))$ | 0 | 1 | 1 | 0 | -1 | -1 | 0 | 1 | 1 |
| $Iy(P_D(m))$ | 0 | 0 | 0 | 1 | 0 | 0 | 1 | 0 | 0 |
| DIRECTION | NONE | RIGHT | RIGHT | LOWER | LEFT | LEFT | LOWER | RIGHT | RIGHT |
| Dx(m) | 1 | 2 | 3 | 3 | 2 | 1 | 1 | 2 | 3 |
| Dy(m) | 1 | 1 | 1 | 2 | 2 | 2 | 3 | 3 | 3 |

PIXEL TRANSFER PATTERN

START POSITION

1002

| | | |
|---|---|---|
| | → | → |
| ← | ← | ↓ |
| ↓ | → | → |

PIXEL TRANSFER DIRECTION

1003

| m | 1 | 2 | 3 | 4 | 5 | 6 | 7 | 8 | 9 |
|---|---|---|---|---|---|---|---|---|---|
| $P_C(m)$ | | 0 | 0 | 1 | 2 | 2 | 1 | 0 | 0 |
| $Ix(P_C(m))$ | 0 | 1 | 1 | 0 | -1 | -1 | 0 | 1 | 1 |
| $Iy(P_C(m))$ | 0 | 0 | 0 | 1 | 0 | 0 | 1 | 0 | 0 |
| DIRECTION | NONE | RIGHT | RIGHT | LOWER | LEFT | LEFT | LOWER | RIGHT | RIGHT |
| Cx(m) | 1 | 2 | 3 | 3 | 2 | 1 | 1 | 2 | 3 |
| Cy(m) | 1 | 1 | 1 | 2 | 2 | 2 | 3 | 3 | 3 |

FILTER COEFFICIENT TRANSFER PATTERN

START POSITION

1004

| | | |
|---|---|---|
| | → | → |
| ← | ← | ↓ |
| ↓ | → | → |

FILTER COEFFICIENT TRANSFER DIRECTION m=5
m=6
m=7
m=8
m=9
1201
1202
1203
1204
1205
1206
1207
1208
1209
1210
LEFT
LOWER
RIGHT
$O_{1,1}=D_{1,1}xC_{1,1}+D_{2,1}xC_{2,1}+D_{3,1}xC_{3,1}+D_{3,2}xC_{3,2}+D_{2,2}xC_{2,2}+D_{1,2}xC_{1,2}$
$O_{2,1}=D_{2,1}xC_{1,1}+D_{3,1}xC_{2,1}+D_{4,1}xC_{3,1}+D_{4,2}xC_{3,2}+D_{3,2}xC_{2,2}+D_{2,2}xC_{1,2}$
$O_{1,2}=D_{1,2}xC_{1,1}+D_{2,2}xC_{2,1}+D_{3,2}xC_{3,1}+D_{3,3}xC_{3,2}+D_{2,3}xC_{2,2}+D_{1,3}xC_{1,2}$
$O_{2,2}=D_{2,2}xC_{1,1}+D_{3,2}xC_{2,1}+D_{4,2}xC_{3,1}+D_{4,3}xC_{3,2}+D_{3,3}xC_{2,2}+D_{2,3}xC_{1,2}$
$O_{1,1}=D_{1,1}xC_{1,1}+D_{2,1}xC_{2,1}+D_{3,1}xC_{3,1}+D_{3,2}xC_{3,2}+D_{2,2}xC_{2,2}+D_{1,2}xC_{1,2}+D_{1,3}xC_{1,3}+D_{2,3}xC_{2,3}+D_{3,3}xC_{3,3}$
$O_{2,1}=D_{2,1}xC_{1,1}+D_{3,1}xC_{2,1}+D_{4,1}xC_{3,1}+D_{4,2}xC_{3,2}+D_{3,2}xC_{2,2}+D_{2,2}xC_{1,2}+D_{2,3}xC_{1,3}+D_{3,3}xC_{2,3}+D_{4,3}xC_{3,3}$
$O_{1,2}=D_{1,2}xC_{1,1}+D_{2,2}xC_{2,1}+D_{3,2}xC_{3,1}+D_{3,3}xC_{3,2}+D_{2,3}xC_{2,2}+D_{1,3}xC_{1,2}+D_{1,4}xC_{1,3}+D_{2,4}xC_{2,3}+D_{3,4}xC_{3,3}$
$O_{2,2}=D_{2,2}xC_{1,1}+D_{3,2}xC_{2,1}+D_{4,2}xC_{3,1}+D_{4,3}xC_{3,2}+D_{3,3}xC_{2,2}+D_{2,3}xC_{1,2}+D_{2,4}xC_{1,3}+D_{3,4}xC_{2,3}+D_{4,4}xC_{3,3}$

FIG. 13

1301

| m | 1 | 2 | 3 | 4 | 5 | 6 | 7 | 8 | 9 |
|---|---|---|---|---|---|---|---|---|---|
| $P_D(m)$ | | 0 | 0 | 1 | 2 | 2 | 1 | 0 | 0 |
| $Ix(P_D(m))$ | 0 | 1 | 1 | 0 | -1 | -1 | 0 | 1 | 1 |
| $Iy(P_D(m))$ | 0 | 0 | 0 | 1 | 0 | 0 | 1 | 0 | 0 |
| DIRECTION | NONE | RIGHT | RIGHT | LOWER | LEFT | LEFT | LOWER | RIGHT | RIGHT |
| Dx(m) | 1 | 2 | 3 | 3 | 2 | 1 | 1 | 2 | 3 |
| Dy(m) | 1 | 1 | 1 | 2 | 2 | 2 | 3 | 3 | 3 |

PIXEL TRANSFER PATTERN

START POSITION

1302

| | | |
|---|---|---|
| | → | → |
| ← | ← | ↓ |
| ↓ | → | → |

PIXEL TRANSFER DIRECTION

1303

| m | 1 | 2 | 3 | 4 | 5 | 6 | 7 | 8 | 9 |
|---|---|---|---|---|---|---|---|---|---|
| $P_C(m)$ | | 1 | 1 | 2 | 3 | 3 | 2 | 1 | 1 |
| $Ix(P_C(m))$ | 0 | 0 | 0 | -1 | 0 | 0 | -1 | 0 | 0 |
| $Iy(P_C(m))$ | 0 | 1 | 1 | 0 | -1 | -1 | 0 | 1 | 1 |
| DIRECTION | NONE | LOWER | LOWER | LEFT | UPPER | UPPER | LEFT | LOWER | LOWER |
| Cx(m) | 3 | 3 | 3 | 2 | 2 | 2 | 1 | 1 | 1 |
| Cy(m) | 1 | 2 | 3 | 3 | 2 | 1 | 1 | 2 | 3 |

FILTER COEFFICIENT TRANSFER PATTERN

START POSITION

1304

| | | |
|---|---|---|
| ← | ↑ | |
| ↓ | ↑ | ↓ |
| ↓ | ← | ↓ |

FILTER COEFFICIENT TRANSFER DIRECTION

FIG. 15
1501
| | | | | | | | | | |
|---|---|---|---|---|---|---|---|---|---|
| m | 1 | 2 | 3 | 4 | | | | | |
| $P_D(m)$ | | 0 | 1 | 2 | | | | | |
| $Ix(P_D(m))$ | 0 | 1 | 0 | -1 | | | | | |
| $Iy(P_D(m))$ | 0 | 0 | 1 | 0 | | | | | |
| DIRECTION | NONE | RIGHT | LOWER | LEFT | | | | | |
| Dx(m) | 1 | 2 | 2 | 1 | | | | | |
| Dy(m) | 1 | 1 | 2 | 2 | | | | | |
PIXEL TRANSFER PATTERN
START POSITION
1502
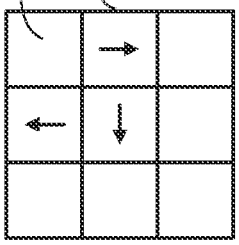
PIXEL TRANSFER DIRECTION
1503
| | | | | | | | | | |
|---|---|---|---|---|---|---|---|---|---|
| m | 1 | 2 | 3 | 4 | | | | | |
| $P_C(m)$ | | 0 | 1 | 2 | | | | | |
| $Ix(P_C(m))$ | 0 | 1 | 0 | -1 | | | | | |
| $Iy(P_C(m))$ | 0 | 0 | 1 | 0 | | | | | |
| DIRECTION | NONE | RIGHT | LOWER | LEFT | | | | | |
| Cx(m) | 1 | 2 | 2 | 1 | | | | | |
| Cy(m) | 1 | 1 | 2 | 2 | | | | | |
FILTER COEFFICIENT TRANSFER PATTERN
START POSITION
1504
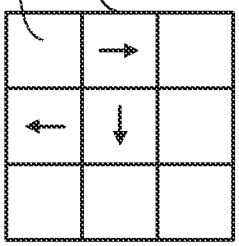
FILTER COEFFICIENT TRANSFER DIRECTION

FILTER PROCESSING APPARATUS AND CONTROL METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Field of the Invention

The present invention relates to a technique of filter processing.

Description of the Related Art

Filter processing is an important technique in the fields of image processing and image recognition. Filter processing generally includes a plurality of multiplications and cumulative addition. The amount of arithmetic operation is proportional to the kernel size (the number of filter coefficients in a filter kernel) of a filter. In recent years, an image processing technique for an embedded system such as a portable terminal, an onboard device, and the like has received a great deal of attention. Along with an increase in the resolution (the number of pixels) of an image, the amount of arithmetic operation by filter processing increases. For this reason, efficient parallel filter processing is demanded. In addition, an input image and a filter kernel change depending on a use case or application. An importance of functions which support a plurality of kinds of kernel sizes in a single system increases. There is proposed a parallel processing method with a high degree of freedom for the kernel size of a filter.

Japanese Patent No. 5376920 (patent literature 1) discloses a technique of efficiently reading out pixels and filter coefficients using a one-dimensional shift register, supplying data to a plurality of multipliers and a cumulative adder, and parallelly calculating filter processing results.

However, according to the technique described in patent literature 1, the arithmetic efficiency undesirably degrades when the size (the width or height) of the processing-target data is smaller than the size of the shift register. In addition, since the output order of the stored coefficients is predetermined, the filter coefficients are reordered and stored in the shift register if the kernel of the filter is rotated, thereby lowering the processing speed.

SUMMARY OF THE INVENTION

According to one aspect of the present invention, a filter processing apparatus for performing filter processing using a filter kernel for processing-target data, comprises: K arithmetic operation units configured to perform predetermined arithmetic operation processing parallelly; a data holding unit configured to hold a plurality of data values included in the processing-target data as an L-dimensional orthogonal array; a coefficient holding unit configured to hold a plurality of filter coefficients included in the filter kernel as an L-dimensional orthogonal array; a first pattern holding unit configured to hold a first pattern that selects K data values input to the K arithmetic operation units from the plurality of data values; a second pattern holding unit configured to hold a second pattern that selects one filter coefficient input to the K arithmetic operation units from the plurality of filter coefficients; and a control unit configured to sequentially input the K data values to the K arithmetic operation units with reference to the first pattern and sequentially input the one common filter coefficient to the K arithmetic operation units with reference to the second pattern.

The present invention provides a technique capable of performing more efficient filter processing.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing examples of transfer patterns of the pixels and the filter coefficients according to the first embodiment;

FIG. 13 is a view showing transfer patterns of pixels and filter coefficients according to a modification;

FIG. 15 is a view showing examples of transfer patterns of pixels and filter coefficients according to the modification.

DESCRIPTION OF THE EMBODIMENTS

Embodiments of the present invention will be described below in detail with reference to the accompanying drawings. Note that the following embodiments are merely examples and do not limit the scope of the present invention.

First Embodiment

A filter processing apparatus for processing image data will be exemplified as the first embodiment of a filter processing apparatus according to the present invention.

<Arrangement of Filter Processing Apparatus>

Figure 2:
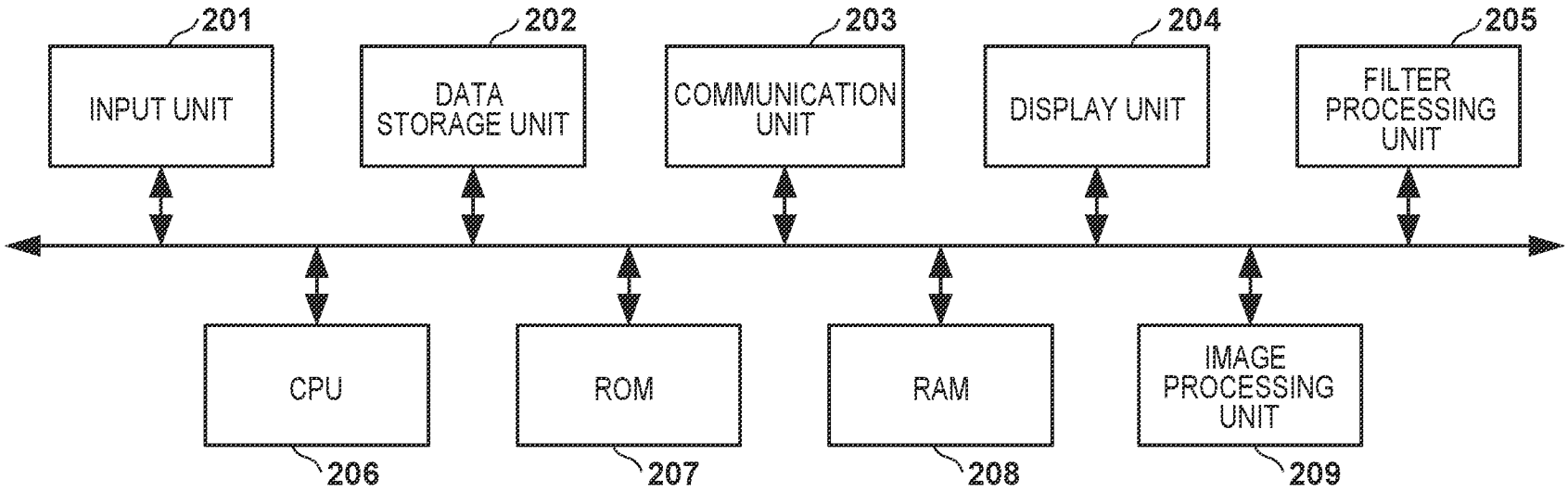
FIG. 2 is a block diagram of a filter processing apparatus according to the first embodiment.

FIG. 2 is a block diagram of the filter processing apparatus according to the first embodiment.

An input unit 201 is a functional unit for receiving an instruction and data input from a user and includes a keyboard, a pointing device, and buttons. A communication unit 203 is an I/F for performing communication between the devices.

A data storage unit 202 is a functional unit for storing image data and is generally formed from a hard disk, a flexible disk, an optical disk (for example, a CD and a DVD), a semiconductor memory, or the like. The data storage unit 202 can store programs and other data in addition to the image data. Alternatively, part of a RAM 208 (to be described later) can be used as the data storage unit 202. Alternatively, an external storage device (not shown) communicably connected via the communication unit 203 may be used as the data storage unit 202.

A display unit 204 is a functional unit for displaying a processing-target image or an image such as a GUI. A CRT or a liquid crystal display device is generally used as the display unit 204. Alternatively, an external display device connected via a cable may be used as the display unit 204. In addition, the display unit 204 and the input unit 201 may be formed from a single device like a known touch screen device. In this case, an input on the touch screen is used as an input of the input unit 201.

A filter processing unit 205 is a functional unit for performing filter processing in accordance with a flowchart (FIG. 1) to be described later. The filter processing unit 205 performs filter processing on an image stored in the RAM 208 and outputs the filter processing result to the data storage unit 202 (or the RAM 208).

A CPU 206 controls the operation of the entire apparatus by executing a software program. A ROM 207 and the RAM 208 store programs, data, and working area necessary for the control operation of the CPU 206 and provide them to the CPU 206. Note that if necessary programs are stored in the data storage unit 202 or the ROM 207, these programs are temporarily loaded in the RAM 208 and performed. Alternatively, the programs may be received via the communication unit 203.

An image processing unit 209 reads out the image data stored in the data storage unit 202 and performs image processing under the control of the CPU 206. For example, the image processing unit 209 adjusts the range of pixel values and writes the result in the RAM 208.

Note that in FIG. 2, only one CPU (the CPU 206) is illustrated, but a plurality of CPUs may be arranged. In addition, the filter processing unit 205 may be formed by the CPU. The respective functional units shown in FIG. 2 may be included in one apparatus, or one or more functional units may be arranged as discrete units and may be connected via a communication path. The filter processing apparatus can include various other constituent elements other than those described above, but this is irrelevant to the scope of the present invention and a detailed description thereof will be omitted.

Note that the filter processing result is used, for example, for image processing or image recognition in a moving image (a plurality of frames) by the CPU 206. The result of image processing or image recognition processed by the CPU 206 is stored in the RAM 208.

<Operation of Filter Processing Apparatus>

Figure 1:
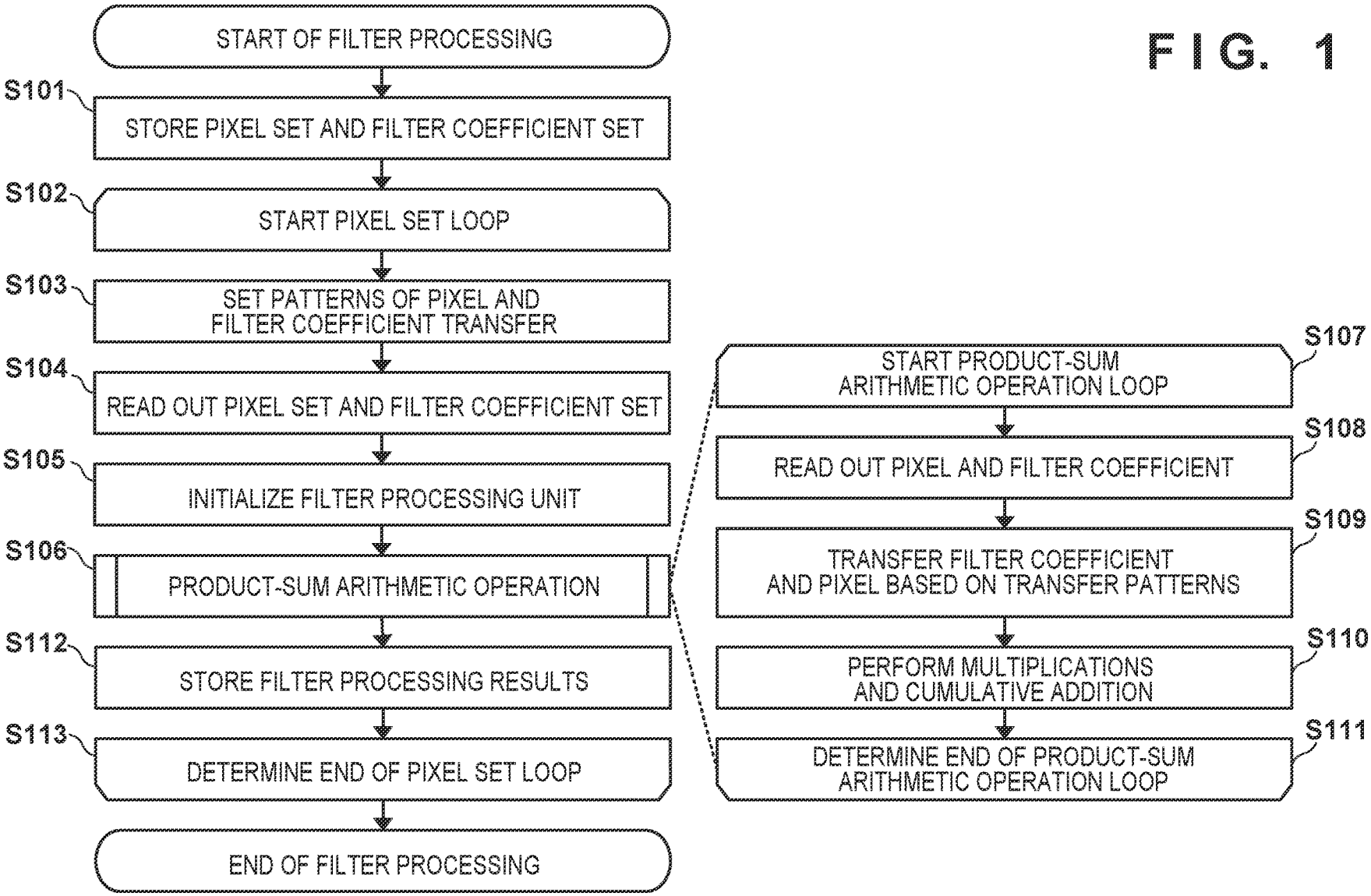
FIG. 1 is a flowchart of filter processing according to the first embodiment.
Figure 3:
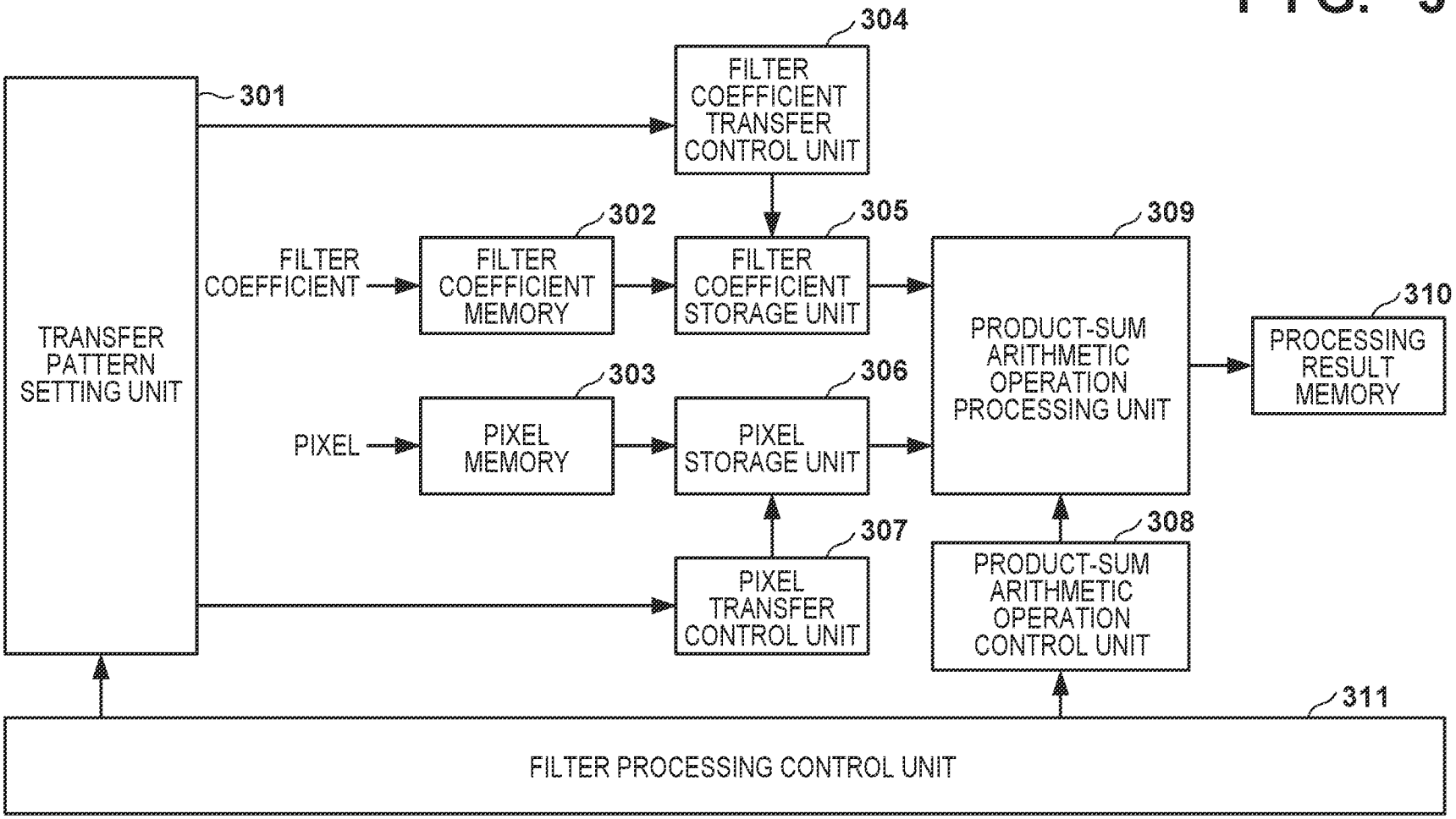
FIG. 3 is a block diagram showing the detailed arrangement of a filter processing unit.

FIG. 3 is a block diagram showing the detailed arrangement of the filter processing unit 205. FIG. 1 is a flowchart of filter processing according to the first embodiment.

In step S101, a filter processing control unit 311 reads out image data (pixel set) stored in the RAM 208 and filter coefficients (a filter coefficient set) and stores them in a filter coefficient memory 302 and a pixel memory 303.

Figure 4:
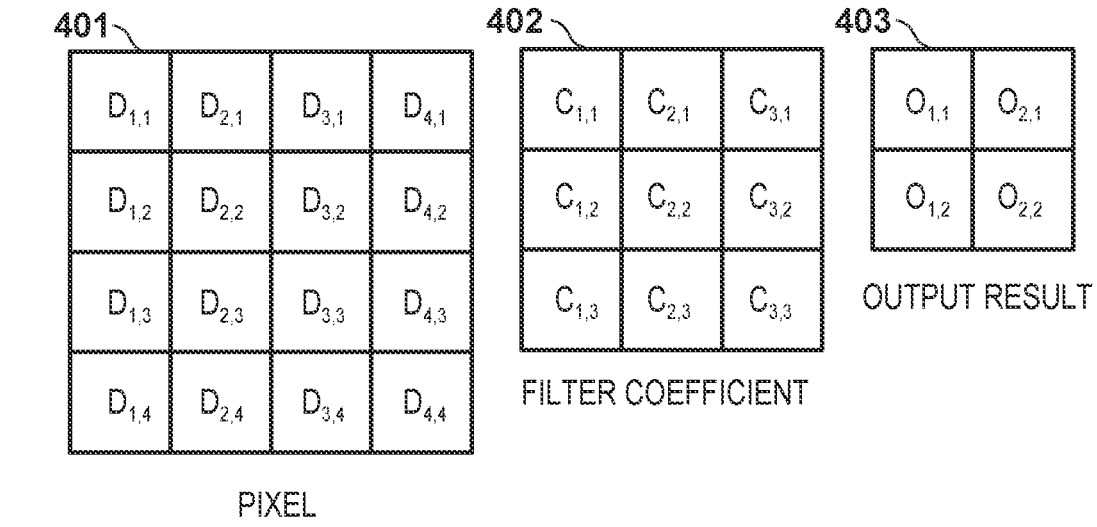
FIG. 4 is a view for explaining the arrays of pixels, filter coefficients, and output results.

FIG. 4 is a view showing the arrays of the pixels, filter coefficients, and output results. Assume that 16 pixels (data values) ($D_{1,1}$ to $D_{4,4}$) are stored in a pixel set 401. Assume also that 9 filter coefficients ($C_{1,1}$ to $C_{3,3}$) are stored in a filter coefficient set 402. A product-sum arithmetic processing unit 309 includes four arithmetic operation units, and the respective arithmetic operation units are arranged to perform predetermined arithmetic operation processing parallelly. The common filter coefficient is multiplied by different pixels parallelly to calculate four filter processing results ($O_{1,1}$ to $O_{2,2}$) parallelly. More specifically, a processing result O is obtained by applying the filter coefficient C for the pixel D in accordance with equation (1):

$$O_{i,j} = \sum_{x=1}^{X}\sum_{y=1}^{Y}(D_{i+x-1,j+y-1} \times C_{x,y}) \tag{1}$$

In step S102, the filter processing control unit 311 starts the loop of the pixel set. The stored pixel sets are processed one by one.

In step S103, the filter processing control unit 311 sets a transfer pattern for a transfer pattern setting unit 301 for holding the pattern. More specifically, the transfer pattern setting unit 301 holds a pixel transfer pattern (Dx(.) and Dy(.)) as the first pattern and a filter coefficient transfer pattern (Cx(.) and Cy(.)) as the second pattern. Here, Dx(.) and Dy(.) are functions for designating the pixel number, and Cx(.) and Cy(.) are functions for designating the filter coefficient number.

In step S104, the filter processing control unit 311 reads out one pixel set from the pixel memory 303 and stores the readout pixel set in a pixel storage unit 306. In addition, the filter processing control unit 311 reads out one filter coefficient set from the filter coefficient memory 302 and stores the readout filter coefficient set in a filter coefficient storage unit 305 for holding the coefficient.

In step S105, the filter processing control unit 311 initializes the filter processing unit 205. In this case, the initial value ("0") of the filter processing result is set, and a variable m indicating the processing order of the filter coefficients is set to "1". In this case, as shown in FIG. 4, four processing results ($O_{1,1}$ to $O_{2,2}$) are set in a processing result set 403. The filter processing result is calculated using equation (1) described above and equations (2) to (6) to be described below.

In step S106, the filter processing control unit 311 scans a filter kernel and performs the product-sum arithmetic operation using the pixels and filter coefficients. Details of the product-sum arithmetic operation will be described later with reference to steps S107 to S111. A product-sum arithmetic operation control unit 308 counts the number of pixels and the number of filter coefficients.

The filter processing results are shown in equations (1) and (2). $O_{i,j}$ is the processing result of the ith row and the jth column, and $P_{i,j,m}$ is the product of the ith row and the jth column for m. The number in the horizontal direction is i, and the number in the vertical direction is j. By changing the value of the variable m, the product-sum arithmetic operation processing unit 309 is controlled. The value of the variable m indicating the processing order also indicates the number of times of cumulative addition.

$$O_{i,j} = \sum_{m=1}^{X \times Y} P_{i,j,m} \tag{2}$$

The product is the product of the pixel and the filter coefficient by:

$$P_{i,j,m} = D_{Dx(m),Dy(m)} \times C_{Cx(m),Cy(m)} \tag{3}$$

$D_{Dx(m),Dy(m)}$ is the pixel, Dx(.) and Dy(.) are functions for designating the pixel number. $C_{Cx(m),Cy(m)}$ is the filter coefficient, and Cx(.) and Cy(.) are functions for designating the filter coefficient. The horizontal number and the vertical number of the pixel change depending on the value of m. The calculations of Dx(.), Dy(.), Cx(.), and Cy(.) will be described later with reference to steps S107 to S111.

In step S112, the filter processing control unit 311 stores the filter processing results ($O_{1,1}$ to $O_{2,2}$) in a processing result memory 310.

In step S113, the filter processing control unit 311 determines whether the loop of the pixel set ends. If all the pixel sets are processed, the loop of the product-sum arithmetic operation ends; otherwise, the process returns to step S103, and the remaining pixel sets are processed.

<Details of Product-Sum Arithmetic Operation (Step S106)>

The product-sum arithmetic operation (step S106) will be described in detail below. The product-sum arithmetic operation (step S106) is formed as loop processing indicated by steps S107 to S111.

In step S107, the filter processing control unit 311 starts the loop of the product-sum arithmetic operation. The value of the variable m is set to "1".

In step S108, a pixel transfer control unit 307 obtains a pixel transfer pattern held in the transfer pattern setting unit 301, transfers the pattern to the pixel storage unit 306, and reads out pixels ($D_{Dx(m),Dy(m)}$). A filter coefficient transfer control unit 304 transfers a filter coefficient transfer pattern held in the transfer pattern setting unit 301 to the filter coefficient storage unit 305, reads out the filter coefficients ($C_{Cx(m),Cy(m)}$), and processes them in order. These operations allow scanning of the filter kernel.

Figure 6:
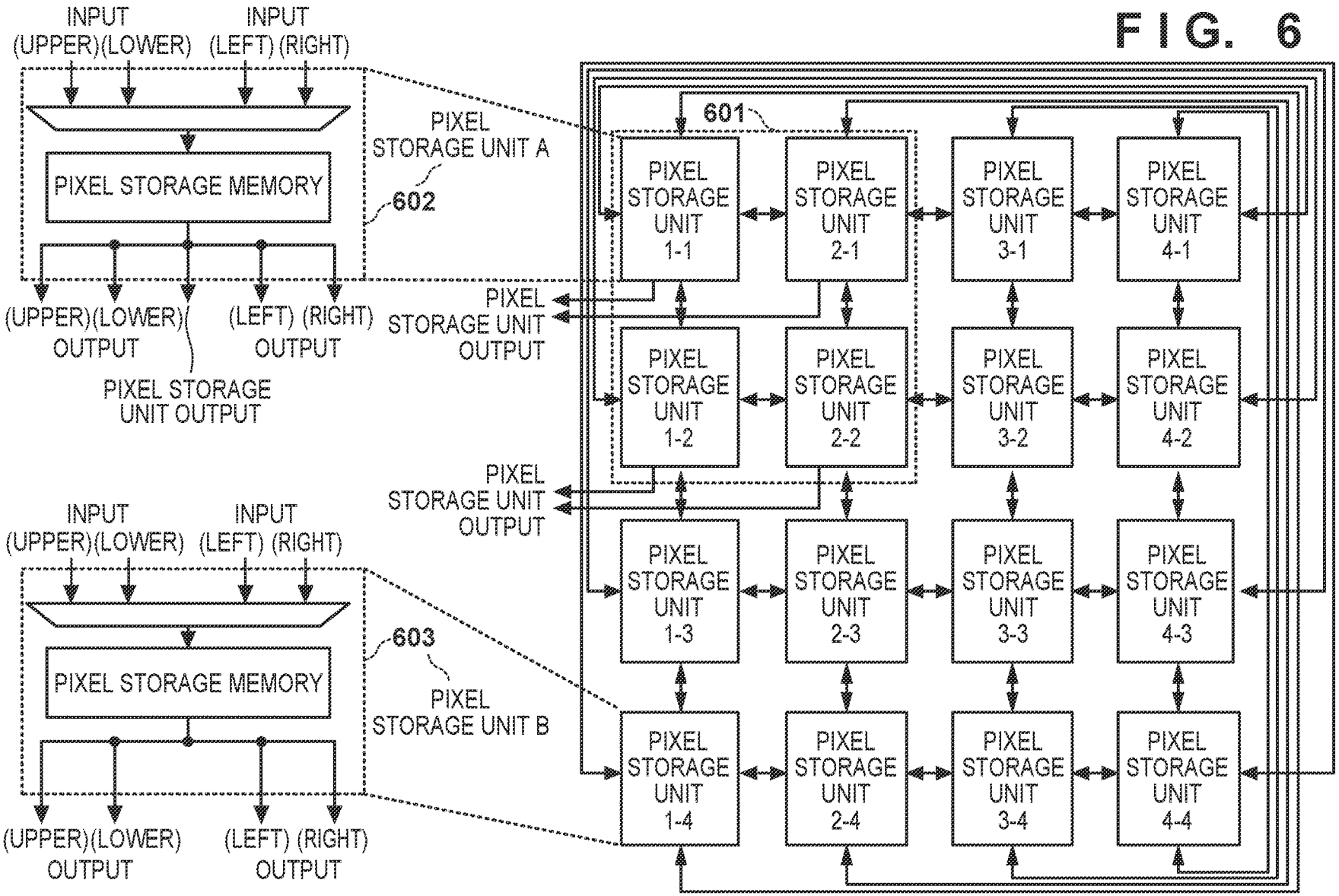
FIG. 6 is a block diagram showing the detailed arrangement of a pixel storage unit.

FIG. 6 is a block diagram showing the detailed arrangement of the pixel storage unit. In this case, 16 pixel storage units are present in the pixel storage unit 306. Each pixel storage unit is connected to pixel storage units adjacent in the vertical and horizontal directions. The pixel storage units are arranged in a two-dimensional orthogonal array. The pixel storage units include two kinds of pixel storage units (pixel storage units A and B). Four pixel storage units indicated in a broken line 601 indicating a predetermined range form the pixel storage units A, and the remaining 12 pixel storage units form the pixel storage units B. The pixel storage units A are connected to the product-sum arithmetic operation processing unit 309, and the pixel storage units B are not connected to the product-sum arithmetic operation processing unit 309. In the first embodiment, there are four parallel arithmetic operation units, and four pixels to be processed parallelly are different. Therefore, the pixel storage units A include four pixel storage units.

The arrangement of the pixel storage unit B is indicated in a broken line 603. One pixel storage unit B can store one pixel. The pixel storage unit B selects pixels from the four (upper, lower, left, and right directions) adjacent pixel storage units based on the pixel transfer pattern held in the transfer pattern setting unit 301, and stores the pixels in the pixel storage memory. In addition, the pixel storage unit B can supply pixels to four adjacent pixel storage units.

The arrangement of the pixel storage unit A is indicated in a broken line 602. As in the pixel storage unit B, one pixel storage unit A can store one pixel. The pixel storage unit A selects pixels from the four adjacent (upper, lower, left, and right) pixel storage units based on the pixel transfer pattern stored in the transfer pattern setting unit 301 and stores them in the pixel storage memory. The pixel storage unit B can supply the pixels to the output destinations of the four adjacent pixel storage units and the pixel storage unit 306.

Figure 7:
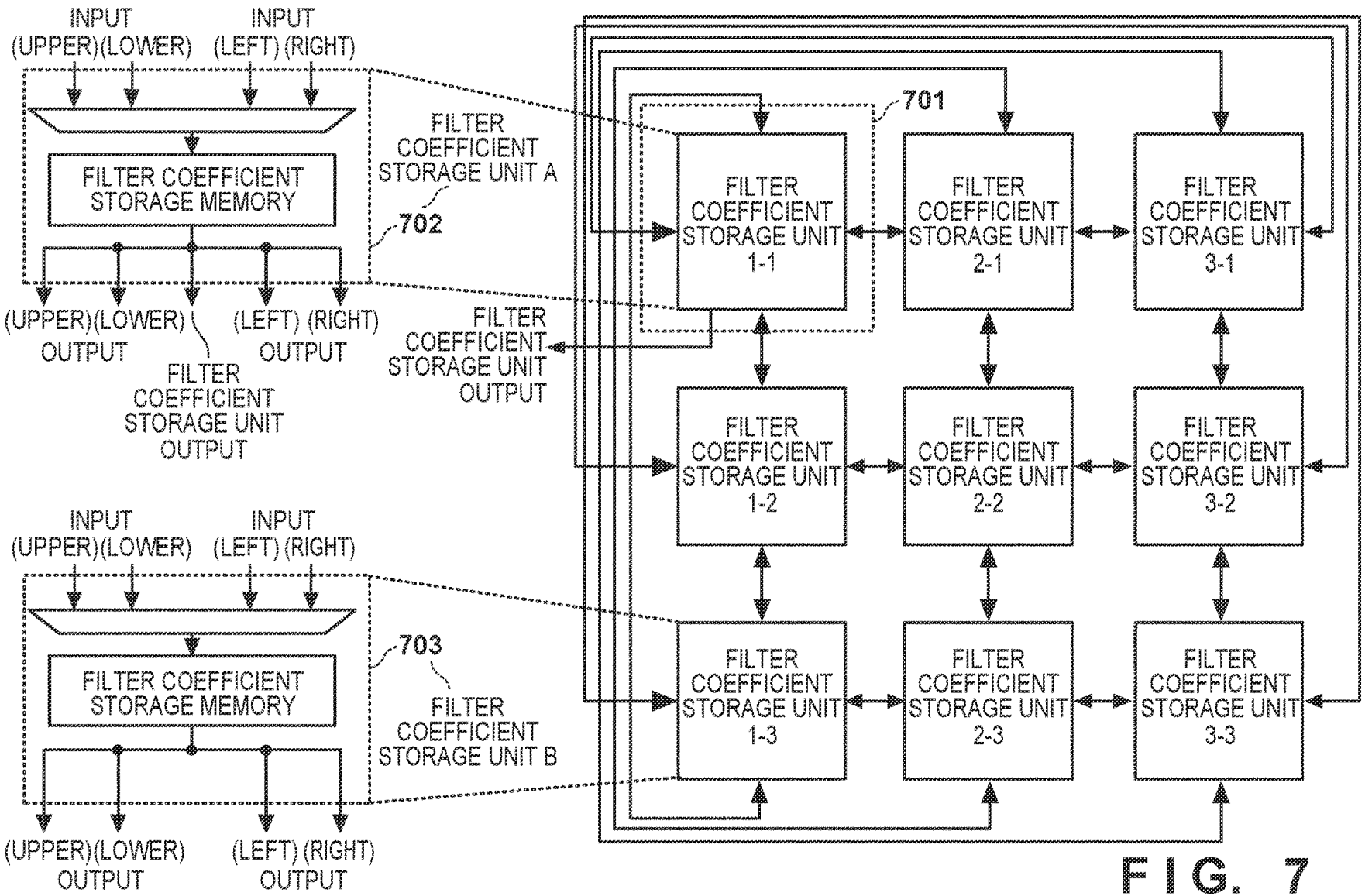
FIG. 7 is a block diagram showing the detailed arrangement of a filter coefficient storage unit.

FIG. 7 is a block diagram showing the detailed arrangement of the filter coefficient storage unit. In this case, there are nine filter coefficient storage units in the filter coefficient storage unit 305. Each filter coefficient storage unit is connected to the filter coefficient storage units adjacent in the upper, lower, left, and right directions. The filter coefficient storage units are arranged in a two-dimensional orthogonal array. The filter coefficient storage units include two kinds of filter coefficient storage units (filter coefficient storage units A and B). One filter coefficient storage unit indicated in a broken line 701 indicating a predetermined position is formed as the filter coefficient storage unit A, and remaining eight filter coefficient storage units are formed as the filter coefficient storage units B. The filter coefficient storage unit A is connected to the product-sum arithmetic operation processing unit 309, and the filter coefficient storage units B are not connected to the product-sum arithmetic operation processing unit 309. There are four parallel arithmetic operation units in the first embodiment, but since the filter coefficients to be processed parallelly are the same, one filter coefficient storage unit A is used.

The arrangement of the filter coefficient storage unit B is indicated in a broken line 703. One filter coefficient storage unit B can store one filter coefficient. The filter coefficient storage unit B selects the filter coefficients from the four adjacent (upper, lower, left, and right) filter coefficient storage units based on the filter coefficient transfer pattern held in the transfer pattern setting unit 301, and stores them in the filter coefficient storage memory. In addition, the filter coefficient storage unit B can supply the filter coefficients to the four adjacent filter coefficient storage units.

The arrangement of the filter coefficient storage unit A is indicated in a broken line 702. As in the filter coefficient storage unit B, one filter coefficient storage unit A can store one filter coefficient. The filter coefficient storage unit A selects filter coefficients from the four adjacent (upper, lower, left, and right) filter coefficient storage units based on the filter coefficient transfer pattern held in the transfer pattern setting unit 301, and stores them in the filter coefficient storage memory. In addition, the filter coefficient storage unit A can supply the filter coefficients to the output destinations of the four adjacent filter coefficient storage units and the filter coefficient storage unit 305.

If the variable m is 1 (the loop of the first time), the initial values of the functions (Dx(1), Dy(1), Cx(1), and Cy(1)) for designating the pixel and the filter coefficient number are set; otherwise (the loop of the second or subsequent time), Dx(.), Dy(.), Cx(.), and Cy(.) are calculated by equations (4) and (5). The variable m is always a positive integer.

$$(Dx(m),Dy(m)) = (Dx(m-1)+Ix(P_D(m)),Dy(m-1)+Iy(P_D(m))) \tag{4}$$

$$(Cx(m),Cy(m)) = (Cx(m-1)+Ix(P_C(m)),Cy(m-1)+Iy(P_C(m))) \tag{5}$$

The output value obtained when the input values of the functions Dx(.), Dy(.), Cx(.), and Cy(.) are m has a relationship with the output value obtained when the input value of each function is (m−1). A description will be made by paying attention to the function Dx(m). The number Dx(m) is the sum of a number Dx(m−1) and a shift value $Ix(P_D(m))$. Ix(.) is a shift function, and $P_D(.)$ is a function indicating a pixel transfer pattern. Ix(.) and Iy(.) indicate shift directions (four directions) and are calculated by:

$$(Ix(n), Iy(n)) = \begin{cases} (1, 0), & \text{if } n = 0 \\ (0, 1), & \text{if } n = 1 \\ (-1, 0), & \text{if } n = 2 \\ (0, -1), & \text{if } n = 3 \end{cases} \quad (6)$$

The functions Dy(m), Cx(m), and Cy(m) are the same as Dx(m), and a detailed description will be omitted.

In step S109, the pixel transfer control unit 307 transfers the four pixels read out in step S108 to the product-sum arithmetic operation processing unit 309. The filter coefficient transfer control unit 304 transfers one filter coefficient read out in step S108 to the product-sum arithmetic operation processing unit 309.

Figure 5:
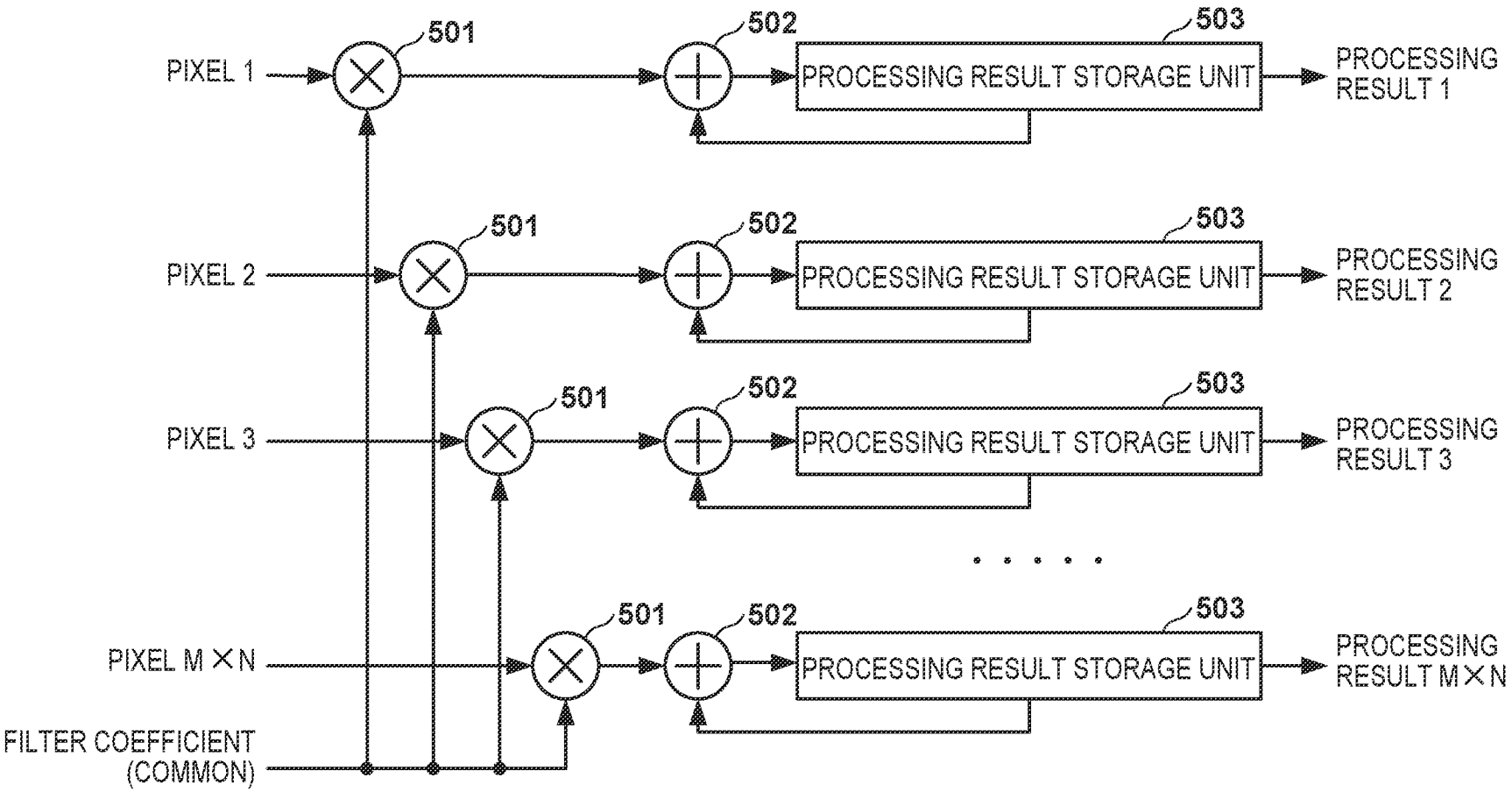
FIG. 5 is a block diagram showing the detailed arrangement of a product-sum arithmetic operation processing unit.

FIG. 5 is a block diagram showing the detailed arrangement of the product-sum arithmetic operation processing unit. This unit includes M×N multipliers 501, M×N adders 502, and M×N processing result storage units 503. The product-sum arithmetic operation processing unit performs parallel product-sum arithmetic operations by M×N pixels and one filter coefficient. In this case, there are four parallel arithmetic operation units, and M×N is "4". Since the initial value of the processing result is set to "0" in step S105, the data stored in the processing result storage unit 503 is "0" when the variable m=1.

In step S110, the product-sum arithmetic operation processing unit 309 performs multiplications and cumulative arithmetic operations using the multipliers 501 and the adders 502 based on equations (1) and (2). The processing results are stored in the processing result storage units 503. Since the arithmetic operation units are four parallel arithmetic operation units, the products ($P_{i,j,m}$, i=1, 2, j=1, 2) of the pixels and filter coefficients shown in equation (2) are calculated parallelly. The calculated products are added parallelly to the processing results ($O_{i,j}$, i=1, 2, j=1, 2).

In step S111, the filter processing control unit 311 determines whether the loop of the product-sum arithmetic operation processing ends. If the value of the variable m is equal to the total number of filter coefficients (X×Y=9), the loop of the product-sum arithmetic operation processing ends, and the process advances to step S112; otherwise, the value of the variable m is incremented (by one), and the process returns to step S107.

<Processing Example of Product-Sum Arithmetic Operation>

A processing example of the product-sum arithmetic operation (step S106) will be described by exemplifying one pixel set and one filter coefficient set. In this case, the pixel set 401 includes 16 pixels ($D_{1,1}$ to $D_{4,4}$). The filter coefficient set 402 includes nine filter coefficients ($C_{1,1}$ to $C_{3,3}$). In addition, the output result set 403 includes four output results ($O_{1,1}$ to $O_{2,2}$).

Before the start of the product-sum arithmetic operation, since the filter processing unit 205 is initialized in step S105, the values of the output results ($O_{1,1}$ to $O_{2,2}$) are set to "0".

In step S107, the value of the variable m is set to "1", and the process advances to step S108. $P_C(m)$ and $P_D(m)$ are functions representing *the filter coefficient transfer pattern and* the pixel transfer pattern, *respectively*. If the variable m is "1", $P_C(.)$, $P_D(.)$, Ix(.), and Iy(.) are not calculated. Instead, the value of the pixel number (Dx(1), Dy(1)) is set to (1, 1), and the value of the filter coefficient number (Cx(1), Cy(1)) is set to (1, 1).

In step S108, the pixel transfer control unit 307 reads out the pixel $D_{1,1}$ corresponding to the pixel number and the filter coefficient $C_{1,1}$ corresponding to the filter coefficient number.

Figure 8:
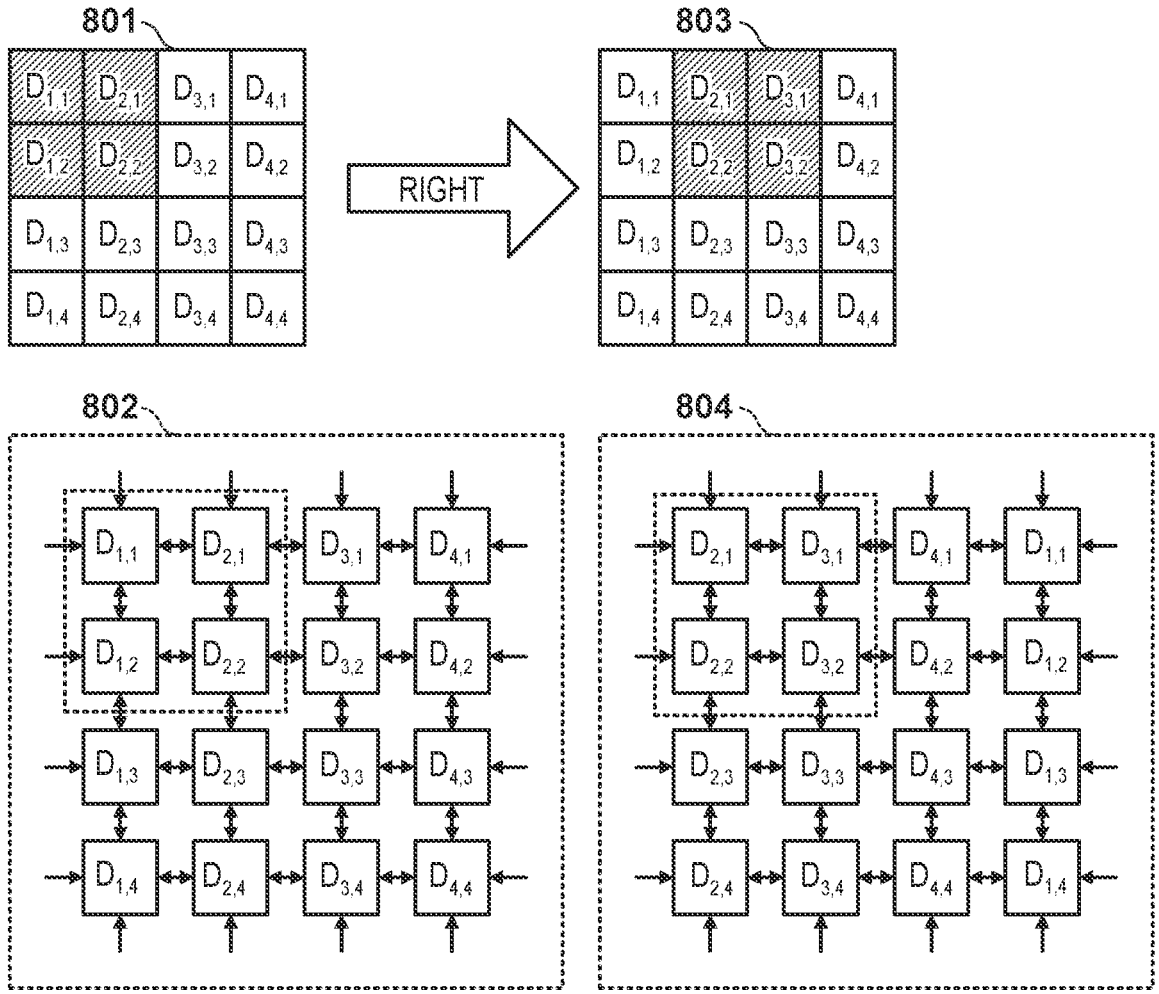
FIG. 8 is a view for explaining changes in pixel storage positions.

FIG. 8 is a view for explaining the change in pixel storage position. More specifically, FIG. 8 shows the pixel storage positions for when m=1 and m=2.

If the variable m is "1", the pixels ($D_{1,1}$ to $D_{2,2}$) indicated in gray in a pixel set 801 are output pixels. An example of pixel data stored in the pixel storage unit 306 shown in FIG. 6 is indicated in a broken line 802. 16 pixel storage units store 16 pixels ($D_{1,1}$ to $D_{4,4}$).

Figure 9:
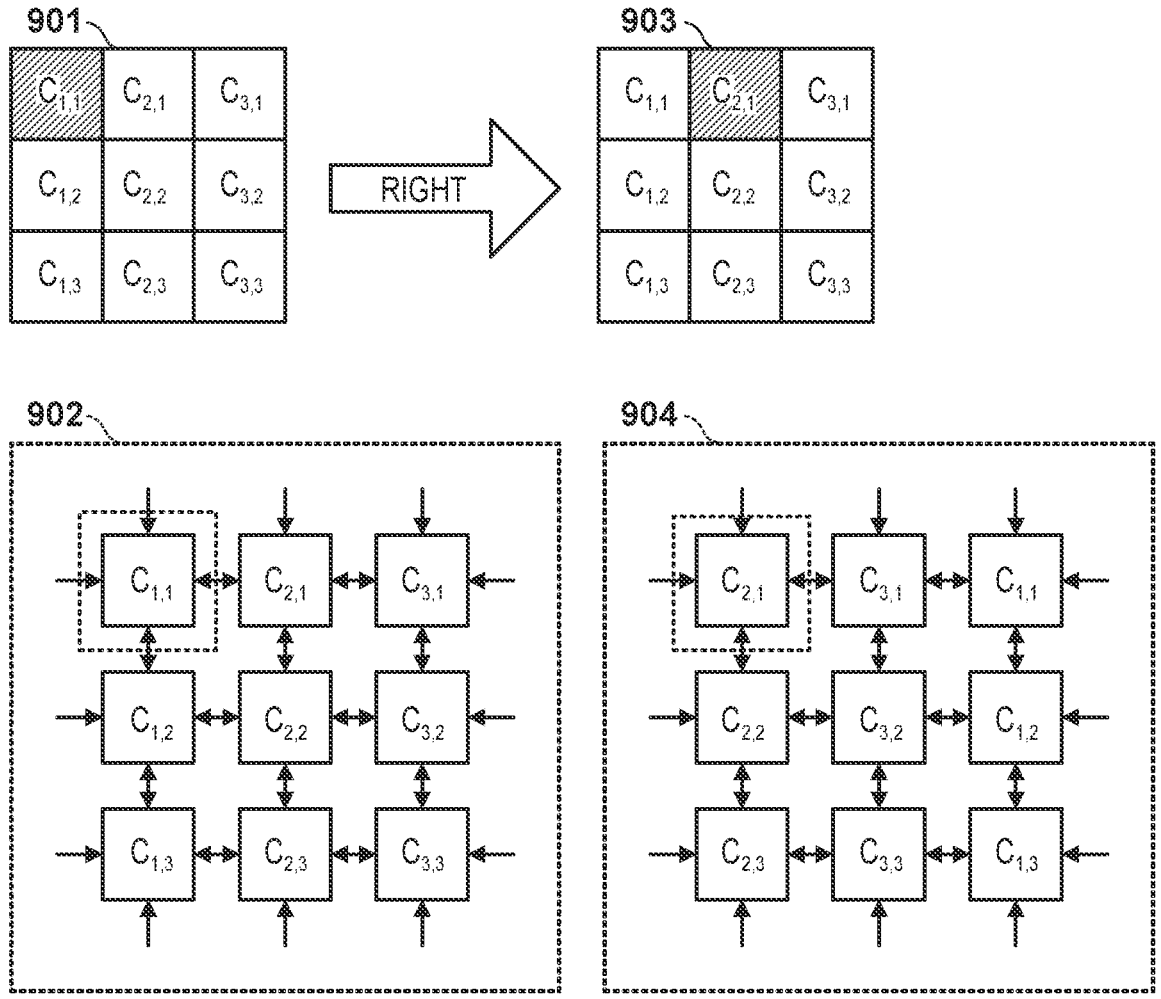
FIG. 9 is a view for explaining changes in filter coefficient storage positions.

FIG. 9 is a view for explaining the change in filter coefficient storage position. FIG. 9 shows the filter coefficient storage positions for m=1 and m=2.

If the variable m is "1", the filter coefficient ($C_{1,1}$) indicated in gray in a filter coefficient set 901 is the output filter coefficient. An example of the coefficient data stored in the filter coefficient storage unit 305 shown in FIG. 6 is indicated in a broken line 902. Nine filter coefficient storage units store nine filter coefficients ($C_{1,1}$ to $C_{3,3}$).

FIG. 10 is a view showing examples of the transfer patterns of the pixels and filter coefficients according to the first embodiment. A pattern 1001 indicates the pixel transfer pattern, and a pattern 1003 indicates the filter coefficient transfer pattern. The pixels and the filter coefficients are scanned in a zig-zag manner as indicated by a pixel transfer direction 1002 and a filter coefficient transfer direction 1004 (m=1 to 9). By this transfer, a two-dimensional filter kernel is applied to the pixel data arrayed in a two-dimensional orthogonal array.

As shown in FIG. 6, pixel storage units connected to the outputs are four pixel storage units. A description will be made by paying attention to one upper left pixel storage unit 1-1. The pixel storage unit 1-1 corresponds to the output result ($O_{1,1}$), and the start position of the pixel transfer is "upper left". In addition, as shown in FIG. 7, the filter coefficient storage unit connected to the output is a filter coefficient storage unit 1-1. The start position of the filter coefficient transfer is "upper left".

Figure 11:
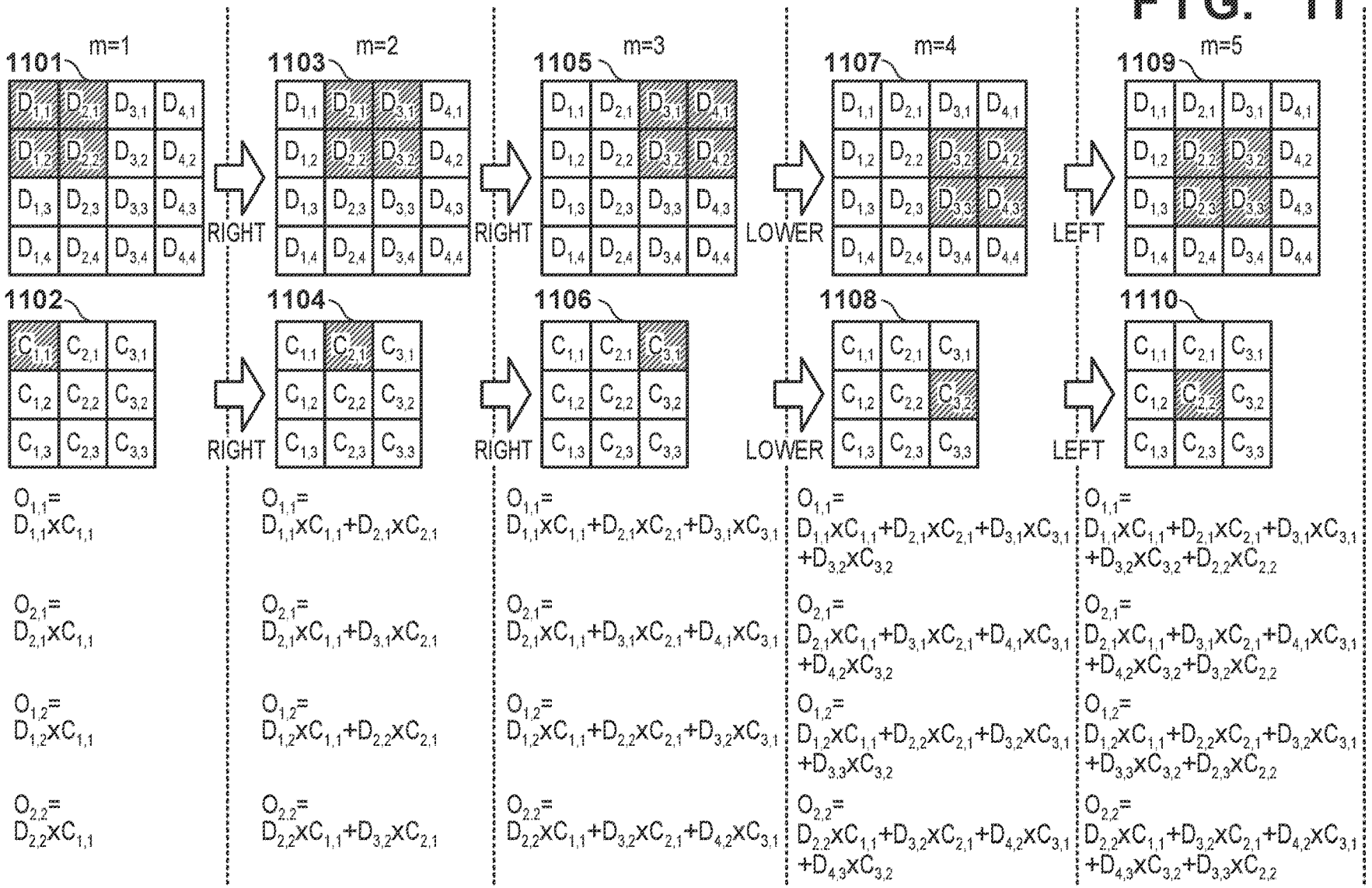
FIG. 11 is a view showing the calculation example of output results (m=1 to 5)
Figure 12:
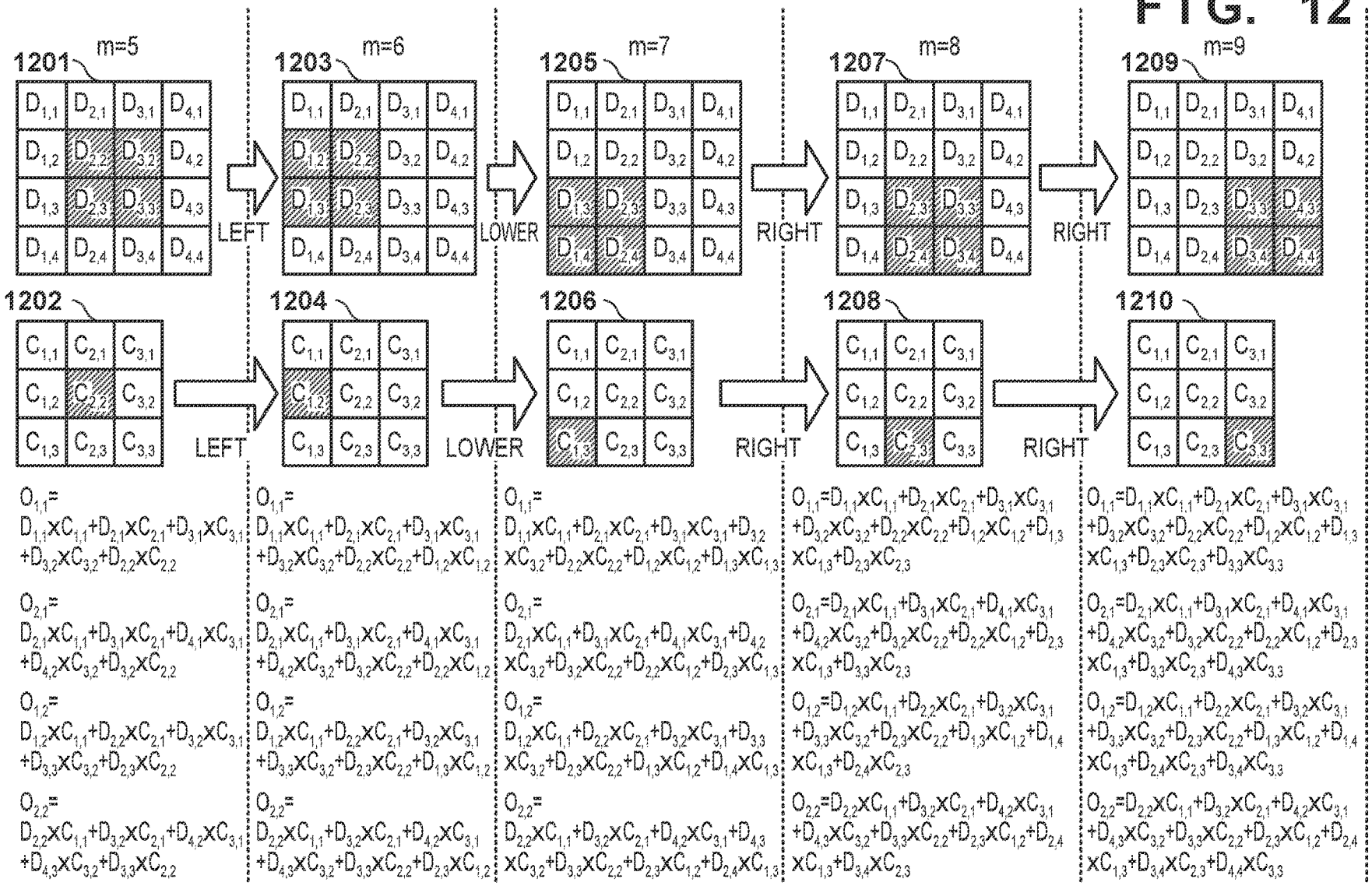
FIG. 12 is a view showing the calculation example of output results (m=5 to 9)

FIGS. 11 and 12 are views showing the output result calculation examples. In particular, target pixels, filter coefficients to be used, and output result calculations for a processing order (the variable m) are shown in FIGS. 11 and 12 in detail.

If the variable m is "1", the product of the pixel $D_{1,1}$ and the filter coefficient $C_{1,1}$ read out in step S109 is added to the initial value "0" to obtain the output result $O_{1,1}$. The calculations of the output results $O_{1,2}$, $O_{2,1}$, and $O_{2,2}$ shown in FIG. 11 are the same as the calculation of the output result $O_{1,1}$, and a detailed description thereof will be omitted. That is, the four output results can be calculated parallelly.

In step S111, the value of the variable m is changed to "2", and the process advances to step S108. If the variable m is larger than "1", $P_C(.)$, $P_D(.)$, Ix(.), and Iy(.) are calculated in accordance with equations (3) to (6).

The pixel transfer pattern $P_D(2)$ is "0", and the shift value ($Ix(P_D(2)$, $Iy(P_D(2))$ is set to (1, 0). The pixel number is calculated using the shift value, and the value of the pixel number (Dx(2), Dy(2)) is set to (2, 1). As shown in equation (6), four kinds of shift values are available. Note that since the input pixel can be directly selected in the pixel storage unit arrangement (in the broken line 602 or 603), the processing speed is high.

The filter coefficient transfer pattern $P_C(2)$ is "0", and the shift value ($Ix(P_C(2)$, $Iy(P_C(2))$ is (1, 0). The filter coefficient number is calculated using the shift value to set the value of the filter coefficient number (Cx(2), Cy(2)) to (2, 1). As shown in equation (6), there are four kinds of shift values. Note that since the input pixel is directly input in the filter coefficient storage unit arrangement (in the broken line 702 or 703), the processing speed is high.

In step S108, the pixel transfer control unit 307 reads out the pixel $D_{2,1}$ corresponding to the pixel number and the filter coefficient $C_{2,1}$ corresponding to the filter coefficient number.

If the variable m is "2", pixels ($D_{2,1}$ to $D_{3,2}$) indicated in gray in a pixel set 803 become output pixels. An example of the pixel data stored in the pixel storage unit 306 shown in FIG. 6 is indicated in a broken line 804. Since the shift direction of the output pixel is "right", the pixel storage unit 1-1 in the pixel storage unit 306 selects a pixel from a pixel storage unit 2-1 and holds it in the pixel storage memory. The pixel in the pixel storage unit 1-1 is replaced with a pixel in the pixel storage unit 2-1. The state of the broken line 802 is changed to the state of the broken line 804.

If the variable m is "2", the filter coefficient ($C_{2,1}$) indicated in gray in a filter coefficient set 903 becomes the output filter coefficient. An example of the coefficient data stored in the filter coefficient storage unit 305 shown in FIG. 7 is indicated in the broken line 902. Since the shift direction of the output filter coefficient is "right", the filter coefficient storage unit 1-1 in the filter coefficient storage unit 305 selects the filter coefficient from a filter coefficient storage unit 2-1 and holds it in the filter coefficient storage memory. The filter coefficient in the filter coefficient storage unit 1-1 is replaced with the filter coefficient in the filter coefficient storage unit 2-1. The state indicated by the broken line 902 is changed to the state indicated by a broken line 904.

As shown in FIG. 6, although the number of pixel storage units connected to the outputs is four, a description will be made by paying attention to one upper left pixel storage unit 1-1. The pixel storage unit 1-1 corresponds to the output result ($O_{1,1}$), and the pixel shift direction is "right". As shown in FIG. 7, the filter coefficient storage unit connected to the output is the filter coefficient storage unit 1-1. The filter coefficient shift direction is "right".

If the variable m is "2", the product of the pixel $D_{2,1}$ read out in step S109 and the filter coefficient $C_{2,1}$ is calculated. The resultant product is added to the product of the pixel $D_{1,1}$ and the filter coefficient $C_{1,1}$ to obtain the output result $O_{1,1}$.

The process of the product-sum arithmetic operation of the output result $O_{1,1}$ has been described above, but the same also applies to the output results $O_{1,2}$, $O_{2,1}$, and $O_{2,2}$, and a description thereof will be omitted.

In step S111, the value of the variable m is changed to "3", and the process advances to step S108. As shown in FIGS. 10 to 12, the output results $O_{1,1}$ to $O_{2,2}$ are calculated by equations (1) to (6) based on the transfer pattern. Until determination is performed upon the end of the product-sum arithmetic operation loop, the pixels and filter coefficients are read out in order based on the transfer patterns, and the multiplications and the cumulative addition are repeated. If the variable m is "9", the output results $O_{1,1}$, $O_{1,2}$, $O_{2,1}$, and $O_{2,2}$ are filter processing results and equivalent to (X=3, Y=3) in equation (1).

As described above, according to the first embodiment, by selecting the shift value (direction) based on the transfer pattern, the pixels and filter coefficients can be efficiently transferred. When an arrangement is made such that each of one pixel storage unit and one filter coefficient storage unit can receive data from four adjacent units, the pixels and filter coefficients necessary for the product-sum arithmetic operation can be output collectively. In other words, since the wiring between separate units need not be performed to simplify the arrangement of the storage unit, the manufacturing cost can also be reduced.

In addition, since the pixel storage units are arranged in the two-dimensional orthogonal array, the number of units in the horizontal and vertical directions can be arbitrarily decided depending on an application.

(Modification)

<Rotation/Inversion of Filter Kernel>

Depending on the holding or placing method, the orientation and angle of a portable terminal or onboard device change, and the rotation angle of an input image (processing-target data) differs. In order to calculate a correct processing result, filter processing must be performed for the processing-target data in an appropriate direction (rotation angle).

In the first embodiment described above, the description has been made using a pattern in which the transfer direction 1002 of the pixel is the same as that of the transfer direction 1004 of the filter coefficient. However, an arbitrary pattern having different transfer directions can be used. A mode in which the kernel of a filter is rotated and filter processing is performed will be described below.

Figure 14:
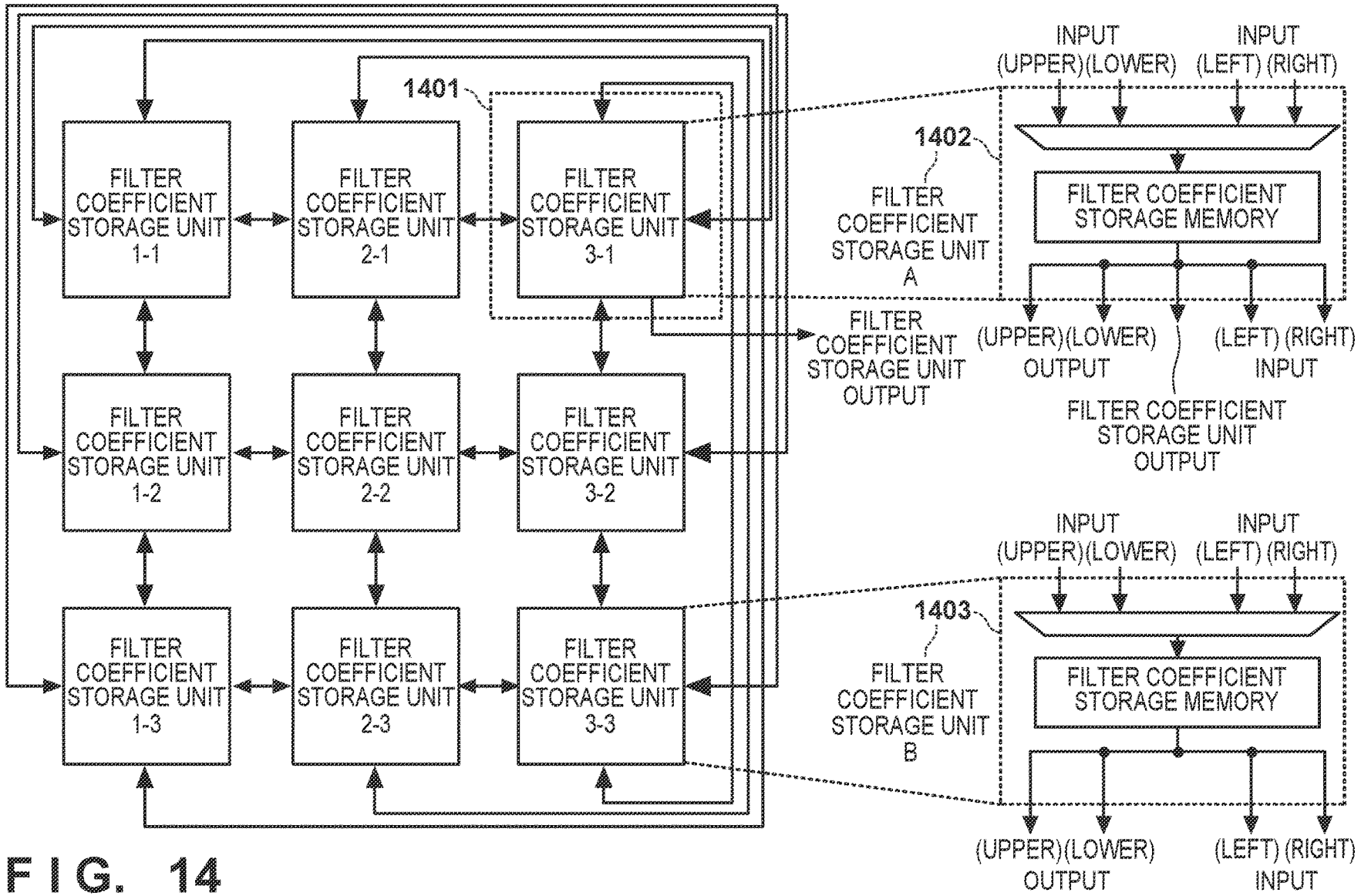
FIG. 14 is a block diagram showing the detailed arrangement of a filter coefficient storage unit according to the modification.

FIG. 13 is a view showing examples of the transfer patterns of the pixels and filter coefficients in the modification. FIG. 14 is a block diagram showing the detailed arrangement of the filter coefficient storage unit in the modification.

Unlike the arrangement (FIG. 7) of the first embodiment, one filter coefficient storage unit 3-1 indicated in a broken line 1401 is the filter coefficient storage unit A and is connected to the output destination of the filter coefficient storage unit 305. The start position of the filter coefficient transfer is "upper right".

When the product-sum arithmetic operation is performed based on the transfer patterns shown in FIG. 13, the output result is equivalent to (X=3, Y=3) in equation (7):

$$O_{i,j} = \sum_{x=1}^{X}\sum_{y=1}^{Y}(D_{i+x-1,j+y-1} \times C_{Y-1,x}) \tag{7}$$

As described above, when the kernel of the filter is rotated in accordance with the orientation (angle) of the input image, no change occurs in the data transfer order in the system. On the other hand, the same result as in a case in which processing is performed by the filter kernel upon rotation of the input image can be obtained. That is, since the data transfer order in the system does not change, the filter processing can be efficiently performed without influencing the processing speed.

The description has been made in FIG. 13 for the example in which the filter kernel is rotated. The present invention is not limited to the rotation of the filter, but filter inversion (horizontal or vertical inversion) is also possible. An appropriate pattern can be decided to cope with various rotations and orientations depending on an application.

<Kernel Size of Filter>

The first embodiment has been described in the example in which the kernel size (the number of coefficients) of the filter has nine coefficients (X×Y=3×3=9). However, the present invention is not limited to a specific kernel size. An arbitrary kernel size (X'×Y') satisfying conditions (8) can be used:

$$1 \le X' \le X,$$

$$1 \le Y' \le Y \tag{8}$$

The arrangement (FIGS. 6 and 7) of the filter processing apparatus described in the first embodiment can perform filter processing in a kernel size of less than 3×3 coefficients in addition to the kernel size of 3×3 coefficients. For example, processing is possible in a filter kernel size of four coefficients (X'×Y'=2×2=4).

FIG. 15 is a view showing the examples of the transfer patterns of the pixels and filter coefficients in the modification. As in the first embodiment (FIG. 10), until determination is performed upon the end of the product-sum arithmetic operation loop, the pixels and filter coefficients are read out in order based on the transfer pattern, and the multiplications and the cumulative addition are repeated. If the variable m is "4", the output results $O_{1,1}$, $O_{1,2}$, $O_{2,1}$, and $O_{2,2}$ are filter processing results and equivalent to (X=2, Y=2) in equation (1). The filter processing result can be output faster than the case in which the kernel size has nine coefficients.

As described above, a single filter processing apparatus can cope with a plurality of kinds of filter kernel sizes. Filter processing apparatuses need not be prepared for the respective kernel sizes, thus reducing the cost is possible.

<Transfer Patterns of Pixels and Filter Coefficients>

In the example of the above embodiment (FIGS. 10 and 13), the pixels and filter coefficients held in the filter coefficient storage unit 305 and the pixel storage unit 306 are sequentially shifted along an almost zig-zag path based on the transfer patterns respectively set for the pixels and the filter coefficients.

Note that the moving path is not limited to the zig-zag path. An arbitrary pattern such as an almost spiral path can be used as far as the path is of a single stroke. The path of the single stroke means a path by which all the held pixels and filter coefficients can be read out, and the number of times of readout of each pixel and each filter coefficient is one.

In addition, if the pixels and the filter coefficients are transferred along the zig-zag path, the number of shift directions calculated by equation (6) is not limited to four (upper, lower, left, and right). For example, the number of shift directions may be three (lower, left, and right). If the number of shift directions is three, all the pixels and filter coefficients necessary for the product-sum arithmetic operation can be output, provided that one pixel storage unit (or one filter coefficient storage unit) receives data from the three adjacent units.

<Significant Pixel and Filter Coefficient>

If the value of the filter coefficient or pixel is "0", the product of the filter coefficient and the pixel becomes 0. This does not influence the convolution arithmetic operation result. For this reason, a pixel and a filter coefficient whose values are not zero can be regarded as significant pixel and filter coefficient. The transfer patterns are set so as not to read out insignificant pixels and filter coefficients, thereby further shortening the processing time.

<Concurrency>

The first embodiment has exemplified the case in which the product-sum arithmetic operation processing unit 309 performs four parallel operations (M=2, N=2) as shown in FIG. 5. However, the number of arithmetic operation units is not limited to "4". The number of arithmetic operation units can be decided to K arbitrary arithmetic operation units depending on required specifications.

<Numbers of Pixels and Filter Coefficients>

The first embodiment has described an example in which the pixel set 401 has 16 pixels, the filter coefficient set 402 has nine filter coefficients, and the processing result set 403 has four processing results as shown in FIG. 4. However, various arrangements may be employed.

Figure 16:
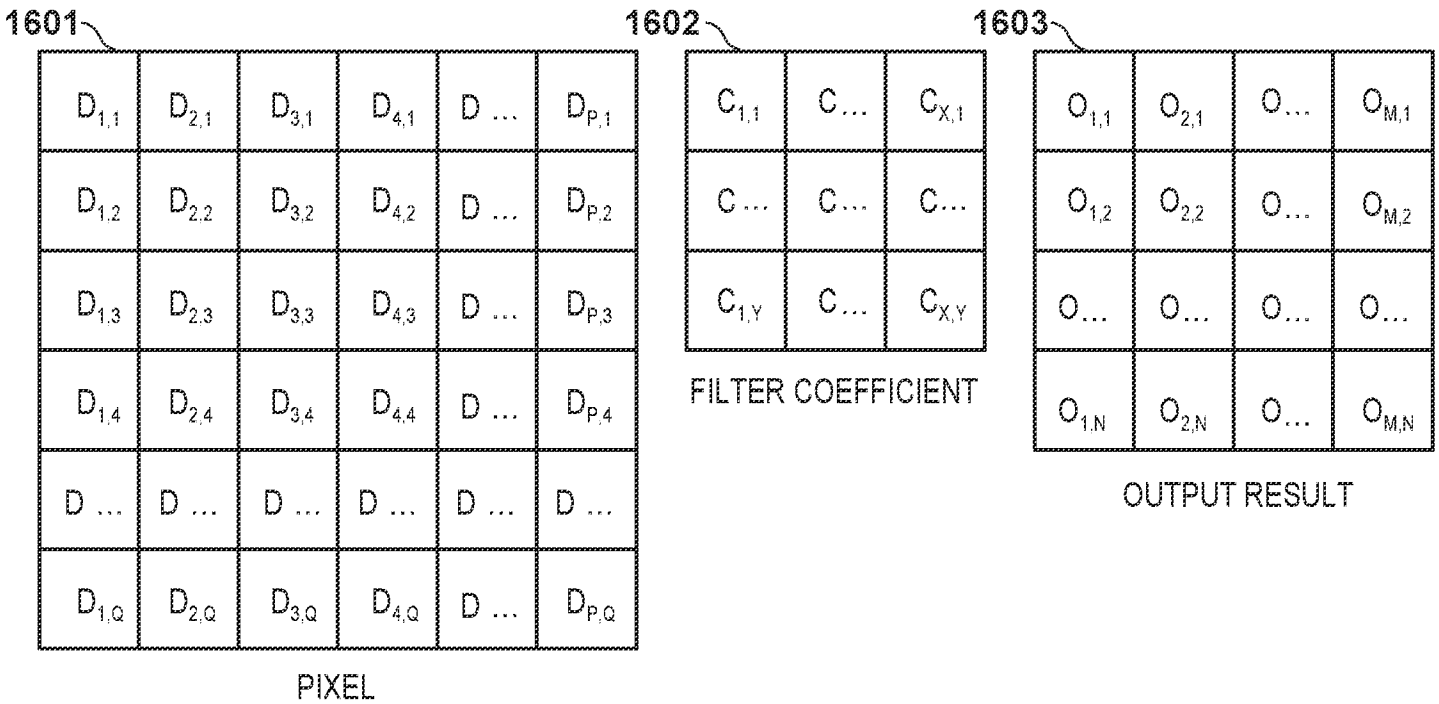
FIG. 16 is a view for explaining the arrays of pixels, filter coefficients, and output results according to the modification.

FIG. 16 is a view for explaining the arrays of pixels, filter coefficients, and output results in the modification. A pixel set 1601 is arranged to include P×Q pixels ($D_{1,1}$ to $D_{P,Q}$) arranged in a two-dimensional orthogonal array. A filter coefficient set 1602 indicates a filter kernel and is formed from X×Y filter coefficients ($C_{1,1}$ to $C_{X,Y}$). A processing result set 1603 is formed from M×N processing results ($O_{1,1}$ to $O_{M,N}$). M, N, P, Q, X, and Y satisfy equations (9) and (10):

$$P+1=M+X \tag{9}$$

$$Q+1=N+Y \tag{10}$$

If the values of X and Y increase, the filter kernel size increases. If the values of M and N increase, the concurrency of the arithmetic operation units increases, so that the number of pixels which can be processed parallel can increase.

In the first embodiment, the filter kernel has a square shape (X=Y=3). If the values of X and Y are different, the shape of the kernel of the processing-target filter becomes a rectangle. The values X and Y are parameters for designating the maximum kernel size of the filter. That is, even if the number of filter coefficients are less than X×Y, processing is possible.

<Video Processing>

The first embodiment has described the example of filter processing for two-dimensional data. However, the number of dimensions is not limited to two. Arbitrary L-dimensional data can be used. For example, the following arrangement is possible for 3-dimensional video data of input data including time-serial information.

A data set is formed from P×Q×R data ($D_{1,1,1}$ to $D_{P,Q,R}$). A filter coefficient set is formed from X×Y×Z filter coefficients ($C_{1,1,1}$ to $C_{X,Y,Z}$). A processing result set is formed from M×N×O processing results ($R_{1,1,1}$ to $R_{M,N,O}$). The processing results are calculated by:

$$R_{i,j,k} = \sum_{x=1}^{X}\sum_{y=1}^{Y}\sum_{z=1}^{Z}(D_{i+x-1,j+y-1,k+z-1} \times C_{x,y,z}) \tag{11}$$

In equation (6), since the array is the two-dimensional orthogonal array, Ix(.) and Iy(.) are arranged in the four (upper, lower, left, and right) directions. In the case of the three-dimensional orthogonal array, since the data and the number of filter coefficient become three-dimensional, the components can be arranged in six (upper, lower, left, right, front, and back) directions. As a matter of course, five (lower, left, right, front, and back) directions may be employed.

<Processing-Target Data>

In the above description, the pixels extracted from the image as input data serving as the filter processing target is assumed. However, the processing-target data is not limited to the image, but may be arbitrary data.

<Filter Coefficient>

The filter coefficient need not be decided by the image processing parameters. For example, an apparatus may automatically generate filter coefficients by machine learning. In addition, the arrangement of filter processing described above can be applied to various convolution arithmetic operations.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201247, filed Oct. 17, 2017, which is hereby incorporated by reference herein in its entirety.

What is claimed is:

1. A filter processing apparatus for performing filter processing, [for processing-target data,] the filter [process] *processing* apparatus comprising:

a predetermined number of arithmetic operation units configured to perform predetermined arithmetic operation on data in parallel;

a data *value* holding unit configured to hold a plurality of data values [included in the processing-target data] *as a two-dimensional orthogonal array*;

a coefficient holding unit configured to hold a plurality of filter coefficients *as a two-dimensional orthogonal array*;

a first pattern setting unit configured to [select one of a plurality of data patterns and] set [the selected] *a* data *value transfer* pattern that [selects] *represents an order of reading out sets of* the predetermined number of data values, *set by set from the data value holding unit, to be* input to the predetermined number of arithmetic operation units, *where each set of the predetermined number of data values is extracted* from the plurality of data values;

a second pattern setting unit configured to select one of a plurality of coefficient *transfer* patterns and set the selected coefficient *transfer* pattern, [that selects one] *where each of the plurality of coefficient transfer patterns represents an order of reading out the plurality of* filter [coefficient] *coefficients, one by one from the coefficient holding unit, to be* input to the predetermined number of arithmetic operation units; [from the plurality of filter coefficients;] and a control unit configured to [sequentially] input *a set of* the predetermined number of data values to the predetermined number of arithmetic operation units with reference to the set data *value transfer* pattern and [sequentially] input [the] one *common* filter coefficient to the predetermined number *of* arithmetic operation units with reference to the *set* coefficient *transfer* pattern.

2. The apparatus according to claim 1, wherein the predetermined *number of* arithmetic operation [includes multiplication processing that multiplies] *units include the predetermined number of multipliers that multiply* the one *common* filter coefficient and the predetermined number of data values.

[3. The apparatus according to claim 2, wherein, in the multiplication processing, the one filter coefficient, which is common to the predetermined number of data values, is multiplied in parallel with each of the predetermined number of data values.]

4. The apparatus according to claim 2, wherein the predetermined number of arithmetic operation units *further include the predetermined number of cumulative adders that* perform cumulative addition of multiplication results sequentially calculated [using the predetermined number of data values and the one filter coefficient sequentially input by the control unit] *by the predetermined number of multipliers*.

5. The apparatus according to claim 4, wherein each of the predetermined number of arithmetic operation units multiplies a data value and a filter coefficient sequentially input by the control unit, and performs cumulative addition of multiplication results.

6. A filter processing apparatus for performing filter processing using a filter kernel, [for processing-target data,] the filter processing apparatus comprising:

K arithmetic operation units configured to perform predetermined arithmetic operation processing parallelly;

a data *value* holding unit configured to hold a plurality of data values [included in the processing-target data] as an L-dimensional orthogonal array;

a coefficient holding unit configured to hold a plurality of filter coefficients included in the filter kernel as an L-dimensional orthogonal array;

a first pattern holding unit configured to hold a first *transfer* pattern that [selects] *represents an order of reading out set of* K data values, *set by set from the data value holding unit, to be* input to the K arithmetic operation units, *where each set of the K data values is extracted* from the plurality of data values;

a second pattern holding unit configured to (*a*) *select one of a plurality of transfer patterns each representing an order of reading out the plurality of filter coefficients, one by one from the coefficient holding unit, to be input to the K arithmetic operation units, and* (*b*) hold *the selected transfer pattern as* a second *transfer* pattern*;* [that selects one filter coefficient input to the K arithmetic operation units from the plurality of filter coefficients;] and a control unit configured to [sequentially] input [the] K data values to the K arithmetic operation units with reference to the first *transfer* pattern and [sequentially] input [the] one filter coefficient to the K arithmetic operation units with reference to the second *transfer* pattern, wherein the data *value* holding unit is configured to [sequentially] provide, to the K arithmetic operation units, K data values arrayed in a predetermined range out of the plurality of data values arranged in the L-dimensional orthogonal array, and wherein the control unit [sequentially] inputs the K data values to the K arithmetic operation units by [sequentially] shifting a data storage position in the data *value* holding unit with reference to the first *transfer* pattern.

7. The apparatus according to claim 6, wherein the coefficient holding unit is configured to [sequentially] provide, to the K arithmetic operation units, [the] one filter coefficient arrayed at a predetermined position out of the plurality of filter coefficients arrayed in the L-dimensional orthogonal array, and

*wherein* the control unit [sequentially] inputs [the] one filter coefficient to the K arithmetic operation units by [sequentially] shifting a filter coefficient storage position in the coefficient holding unit with reference to the second *transfer* pattern.

8. A filter processing apparatus for performing filter processing using a filter kernel, [for processing-target data,] the filter processing apparatus comprising:

K arithmetic operation units configured to perform predetermined arithmetic operation processing parallelly;

a data *value* holding unit configured to hold a plurality of data values [included in the processing-target data] as an L-dimensional orthogonal array;

a coefficient holding unit configured to hold a plurality of filter coefficients included in the filter kernel as an L-dimensional orthogonal array;

a first pattern holding unit configured to hold a first *transfer* pattern that [selects] *represents an order of reading out sets of* K data values*, set by set from the data value holding unit, to be* input to the K arithmetic operation units*, where each set of the K data values is extracted* from the plurality of data values;

a second pattern holding unit configured to (*a*) *select one of a plurality of transfer patterns each representing an order of reading out the plurality of filter coefficients, one by one from the coefficient holding unit, to be input to the K arithmetic operation units, and* (*b*) hold *the selected transfer pattern as* a second *transfer* pattern*;* [that selects one filter coefficient input to the K arithmetic operation units from the plurality of filter coefficients;] and a control unit configured to [sequentially] input [the] K data values to the K arithmetic operation units with reference to the first *transfer* pattern and [sequentially] input [the] one filter coefficient to the K arithmetic operation units with reference to the second *transfer* pattern, wherein the first *transfer* pattern is a pattern set such that all significant data values included in the plurality of data values are input *set by set* to the K arithmetic operation units by a plurality of times of shifting of a data storage position by the control unit, and the number of times of input of each *set of K* data [value] *values* is one, and wherein the second *transfer* pattern is a pattern set such that all significant filter coefficients included in the plurality of filter coefficients are input *one by one* to the K arithmetic operation units by a plurality of times of shifting of a filter coefficient storage position by the control unit, and the number of times of input of each filter coefficient is one.

9. The apparatus according to claim 1, wherein [the processing-target] data *corresponding to the plurality of data values* is image data.

10. The apparatus according to claim 9, wherein the apparatus further comprises a changing unit configured to change an orientation of the *transfer* second pattern in accordance with an orientation of the image data in [an] *the* orthogonal array in the data *value* holding unit.

11. The apparatus according to claim 7, wherein [the processing-target] data *corresponding to the plurality of data values* is two-dimensional data, and $$L=2.$$

12. The apparatus according to claim 11, wherein the control unit shifts a data storage position in the data *value* holding unit and a filter coefficient storage position in the coefficient holding unit to one of four directions along the respective array directions of the orthogonal array.

13. The apparatus according to claim 11, wherein if the [processing-target data includes] *plurality of data values are* P×Q data values, the filter kernel includes X×Y filter coefficients, and a result of the filter processing includes M×N processing result, the following equations are satisfied:

$$K=M\times N;$$

$$P+1=M+X; \text{ and}$$

$$Q+1=N+Y.$$

14. The apparatus according to claim 13, wherein the M×N processing results are obtained as results of cumulative addition, for each arithmetic operation unit, of multiplication results sequentially calculated by the K arithmetic operation units.

15. The apparatus according to claim 12, wherein the control unit sequentially shifts a data storage position in the data *value* holding unit and a filter coefficient storage position in the coefficient holding unit along a substantially zig-zag path.

16. The apparatus according to claim 12, wherein the control unit sequentially shifts a data storage position in the data *value* holding unit and a filter coefficient storage position in the coefficient holding unit along a substantially spiral path.

17. The apparatus according to claim 7, wherein [the processing-target] data *corresponding to the plurality of data values* is three-dimensional data, and $$L=3.$$

18. The apparatus according to claim 17, wherein the control unit shifts a data storage position in the data *value* holding unit and a filter coefficient storage position in the coefficient holding unit to one of six directions along the respective array directions of the orthogonal array.

[19. A control method of a filter processing apparatus for performing filter processing for processing-target data, the filter processing apparatus including:

a predetermined number of arithmetic operation units configured to perform predetermined arithmetic operation on data in parallel, a data holding unit configured to hold a plurality of data values included in the processing-target data, a coefficient holding unit configured to hold a plurality of filter coefficients, a first pattern setting unit configured to select one of a plurality of data patterns and set the selected data pattern that selects the predetermined number of data values input to the predetermined number of arithmetic operation units from the plurality of data values, and a second pattern setting unit configured to select one of a plurality of coefficient patterns and set the selected coefficient pattern that selects one filter coefficient input to the predetermined number of arithmetic operation units from the plurality of filter coefficients, the method comprising:

inputting the predetermined number of data values to the predetermined number of arithmetic operation units with reference to the set data pattern and inputting the one common filter coefficient to the predetermined number of arithmetic operation units with reference to the coefficient pattern; and multiplying the one filter coefficient and the predetermined number of data values using the predetermined number of arithmetic operation units.]

20. A non-transitory computer-readable recording medium storing a program that causes a computer to function as a filter processing apparatus for performing filter processing, [for processing-target data] *the filter processing apparatus* comprising:

a predetermined number of arithmetic operation units configured to perform predetermined arithmetic operation on data in parallel;

a data *value* holding unit configured to hold a plurality of data values [included in the processing-target data;] *as a two-dimensional orthogonal array;* a coefficient holding unit configured to hold a plurality of filter coefficients *as a two-dimensional orthogonal array*;

a first pattern setting unit configured to [select one of a plurality of data patterns and] set [the selected] *a* data *value transfer* pattern that [selects] *represents an order of reading out sets of* the predetermined number of data values, *set by set from the data value holding unit, to be* input to the predetermined number of arithmetic operation units, *where each set of the predetermined number of data values is extracted* from the plurality of data values;

a second pattern setting unit configured to select one of a plurality of coefficient *transfer* patterns and set the selected coefficient *transfer* pattern, [that selects one] *where each of the plurality of coefficient transfer patterns represents an order of reading out the plurality of* filter [coefficient] *coefficients, one by one from the coefficient holding unit, to be* input to the predetermined number of arithmetic operation units; [from the plurality of filter coefficients;] and a control unit configured to [sequentially] input *a set of* the predetermined number of data values to the predetermined number of arithmetic operation units with reference to the set data *value transfer* pattern and [sequentially] input [the] one *common* filter coefficient to the predetermined number *of* arithmetic operation units with reference to the *set* coefficient *transfer* pattern.

21. The apparatus according to claim 1, wherein the data *value* holding unit is configured to sequentially provide, to the predetermined number of arithmetic operation units, *a* predetermined number of data values arrayed in a predetermined range out of the plurality of data values, and wherein the control unit [sequentially] inputs *a set of* the predetermined number of data values to the predetermined number of arithmetic operation units by [sequentially] shifting a data storage position in the data *value* holding unit with reference to the set data *value transfer* pattern.

22. The apparatus according to claim 1, wherein the set data *value transfer* pattern is a pattern set such that all significant data values included in the plurality of data values are input to the predetermined number of arithmetic operation units by a plurality of times of shifting of a data storage position by the control unit, and the number of times of input of each data value is one, and wherein the set coefficient *transfer* pattern is a pattern set such that all significant filter coefficients included in the plurality of filter coefficients are input to the predetermined number of arithmetic operation units by a plurality of times of shifting of a filter coefficient storage position by the control unit, and the number of times of input of each filter coefficient is one.

*23. The apparatus according to claim 1, wherein the second pattern setting unit selects and sets another one of a plurality of coefficient transfer patterns so as to change the order of the reading out of the plurality of filter coefficients to be input to the predetermined number of arithmetic operation units.*

*24. The apparatus according to claim 1, wherein in each of the plurality of coefficient transfer patterns, the plurality of filter coefficients are read out one by one such that a next filter coefficient which is to be read out next to a current filter coefficient is selected from filter coefficients adjacent to the current filter coefficient in the two-dimensional array and a number of times of reading out each filter coefficient is one.*

* * * * *